(12) United States Patent  
Shibata

(10) Patent No.: US 8,890,935 B2  
(45) Date of Patent: Nov. 18, 2014

(54) CAPTURING DEVICE, IMAGE PROCESSING METHOD, AND PROGRAM

(75) Inventor: Mitsuru Shibata, Tokyo (JP)

(73) Assignee: Sony Corporation (JP)

( * ) Notice: Subject to any disclaimer, the term of this patent is extended or adjusted under 35 U.S.C. 154(b) by 411 days.

(21) Appl. No.: 12/924,576

(22) Filed: Sep. 30, 2010

(65) Prior Publication Data

US 2011/0090315 A1    Apr. 21, 2011

(30) Foreign Application Priority Data

Oct. 20, 2009  (JP) ................. P2009-241238

(51) Int. Cl.
*H04N 13/02*    (2006.01)
*H04N 13/04*    (2006.01)

(52) U.S. Cl.
CPC ....... *H04N 13/0296* (2013.01); *H04N 13/0454* (2013.01); *H04N 13/0217* (2013.01); *H04N 13/0402* (2013.01); *H04N 13/0289* (2013.01)
USPC .. 348/46; 348/51; 348/E13.026; 348/E13.074

(58) Field of Classification Search
CPC ........... H04N 13/0438; H04N 13/0497; G02B 27/2228
USPC ................ 348/43, 46; 396/324–331
See application file for complete search history.

(56) References Cited

U.S. PATENT DOCUMENTS

| | | | |
|---|---|---|---|
| 6,278,480 B1 * | 8/2001 | Kurahashi et al. | 348/59 |
| 6,549,650 B1 * | 4/2003 | Ishikawa et al. | 382/154 |
| 2004/0201774 A1 * | 10/2004 | Gennetten | 348/375 |

FOREIGN PATENT DOCUMENTS

| | | | | |
|---|---|---|---|---|
| JP | 2001-251403 A | | 9/2001 | |
| JP | 3935812 B2 | | 4/2004 | |
| JP | 2009047912 A | * | 3/2009 | H04N 5/225 |

* cited by examiner

*Primary Examiner* — Andy Rao
*Assistant Examiner* — Nguyen Truong
(74) *Attorney, Agent, or Firm* — Lerner, David, Littenberg, Krumholz & Mentlik, LLP

(57) ABSTRACT

A capturing device includes a display section that changes between and displays a three-dimensional (3D) image and a two-dimensional (2D) image, and a controller that performs an image display control for the display section, wherein the controller changes a display mode of an image displayed on the display section, from a 3D image display to a 2D image display, in accordance with preset setting information, at the time of performing a focus control process.

4 Claims, 18 Drawing Sheets

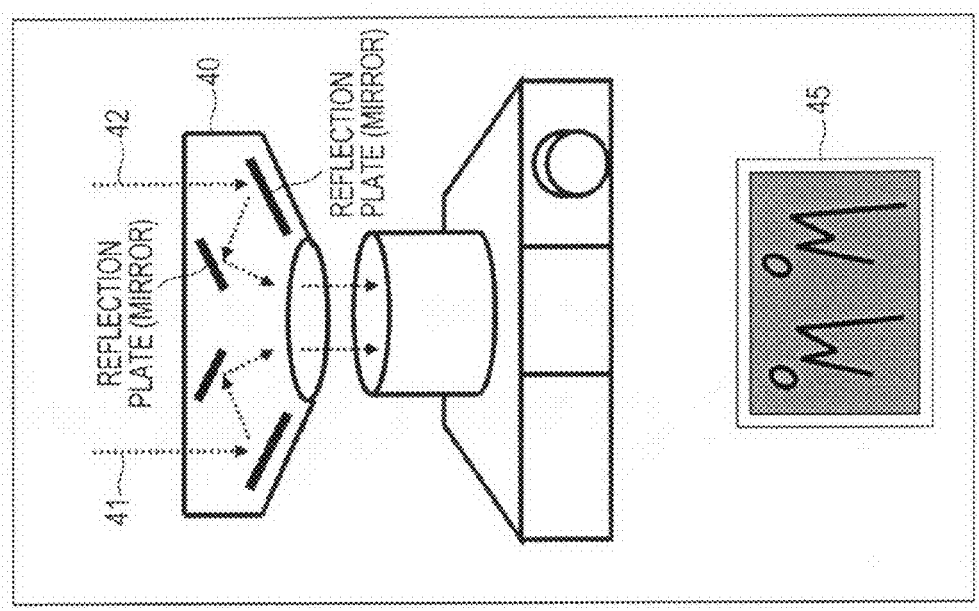
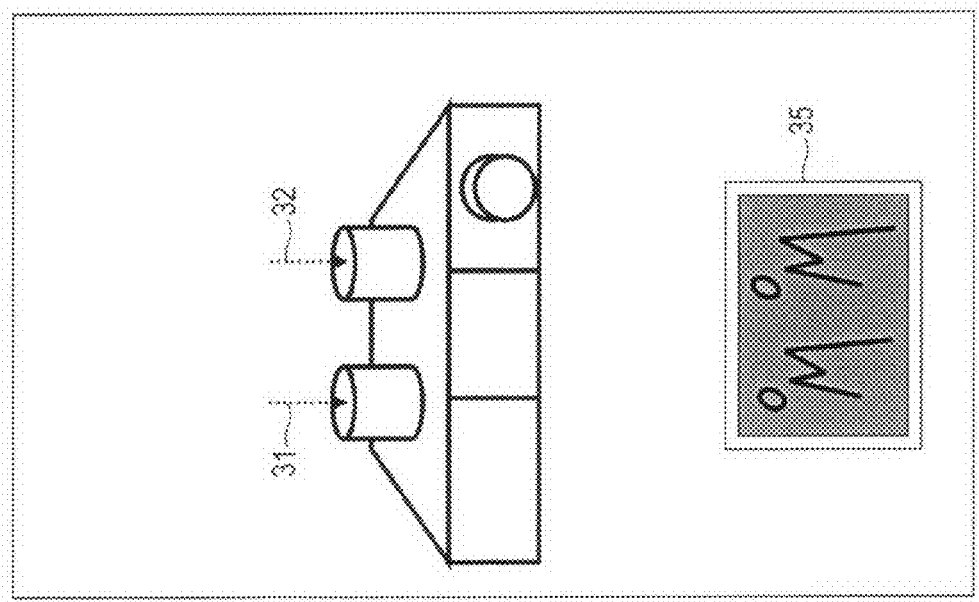

EVF DISPLAY

DISPLAY SECTION (REAR MONITOR) DISPLAY
STEREOSCOPIC DISPLAY (FLAT DISPLAY IS ALSO POSSIBLE)
FLAT DISPLAY

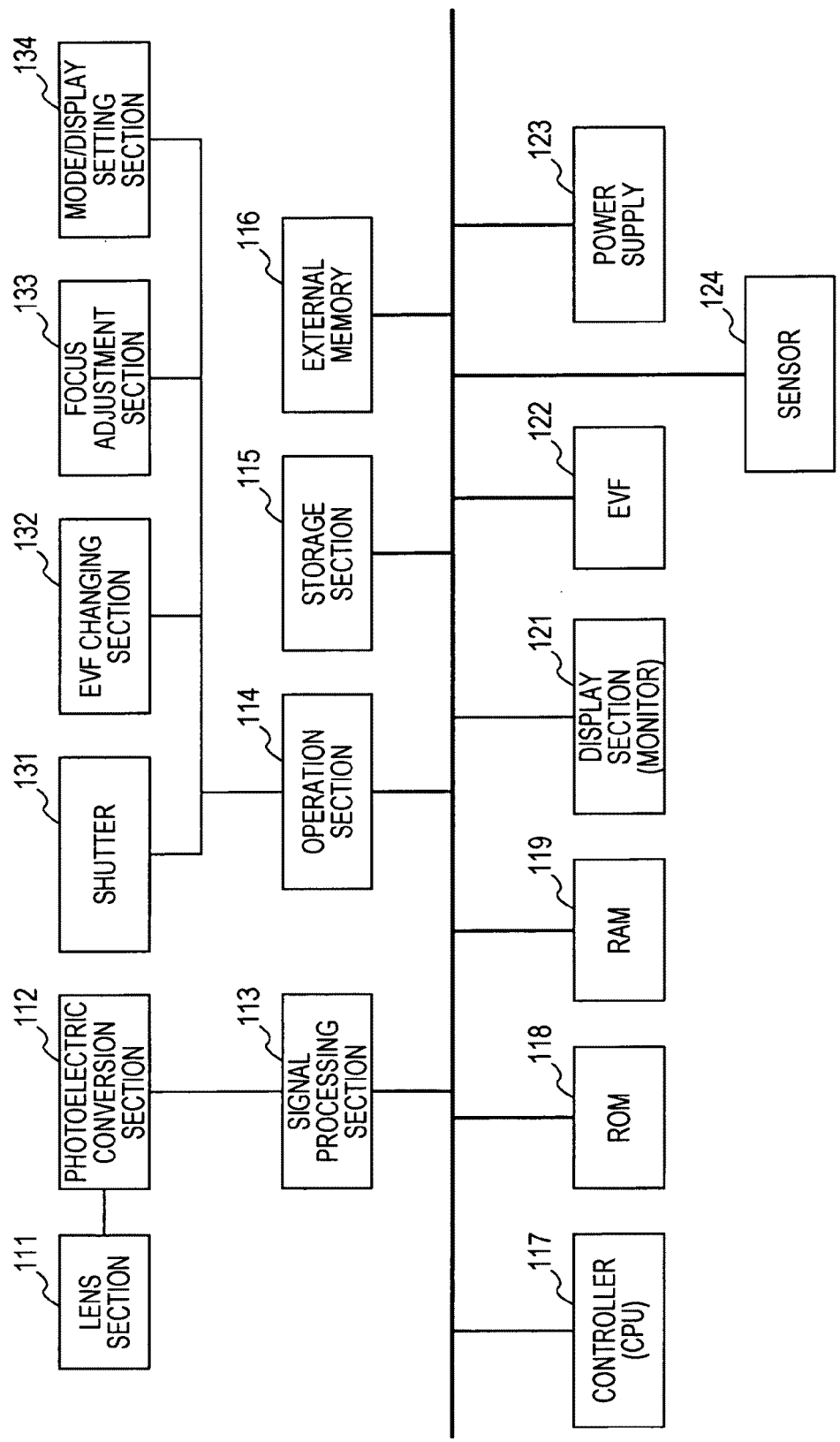

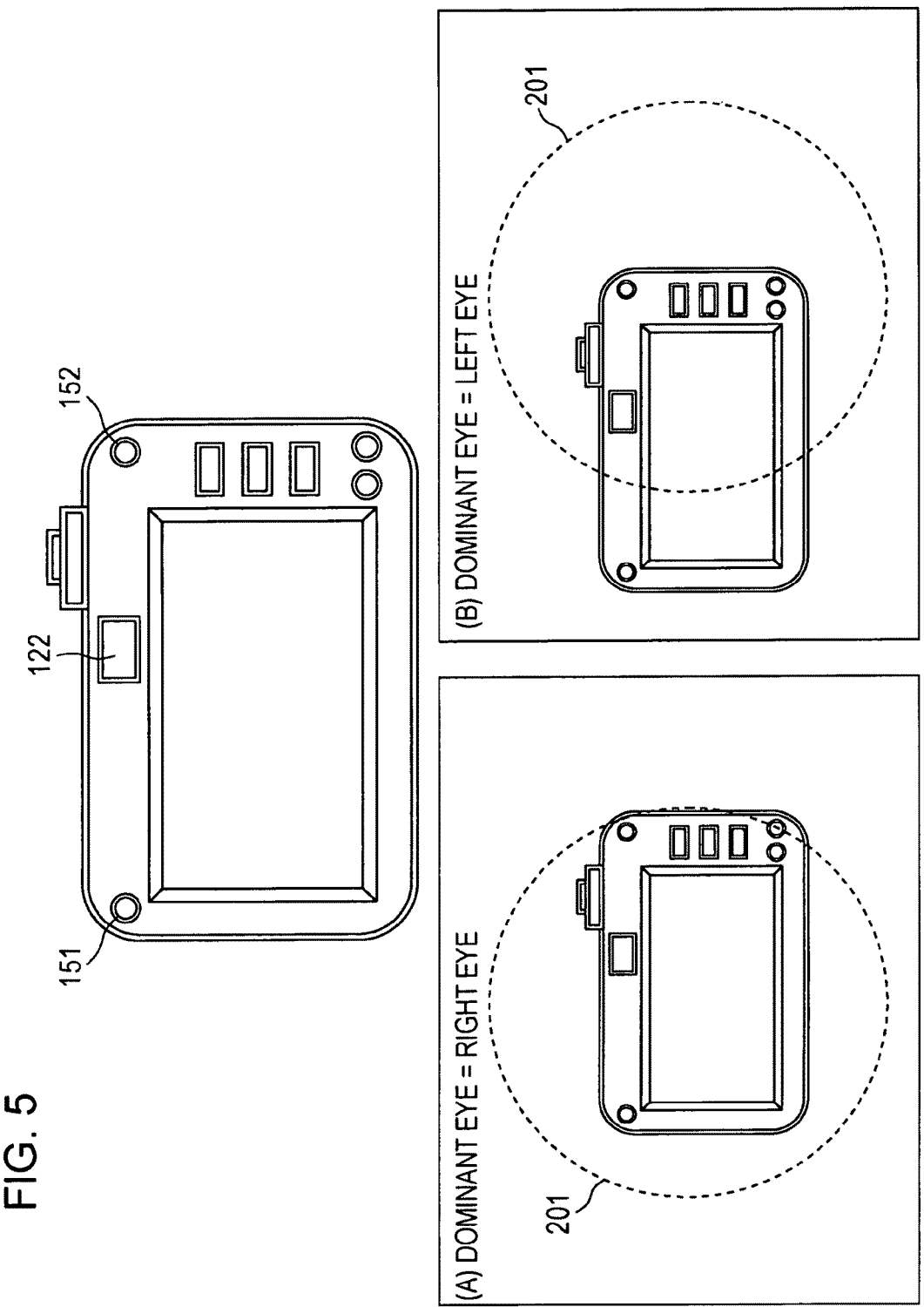

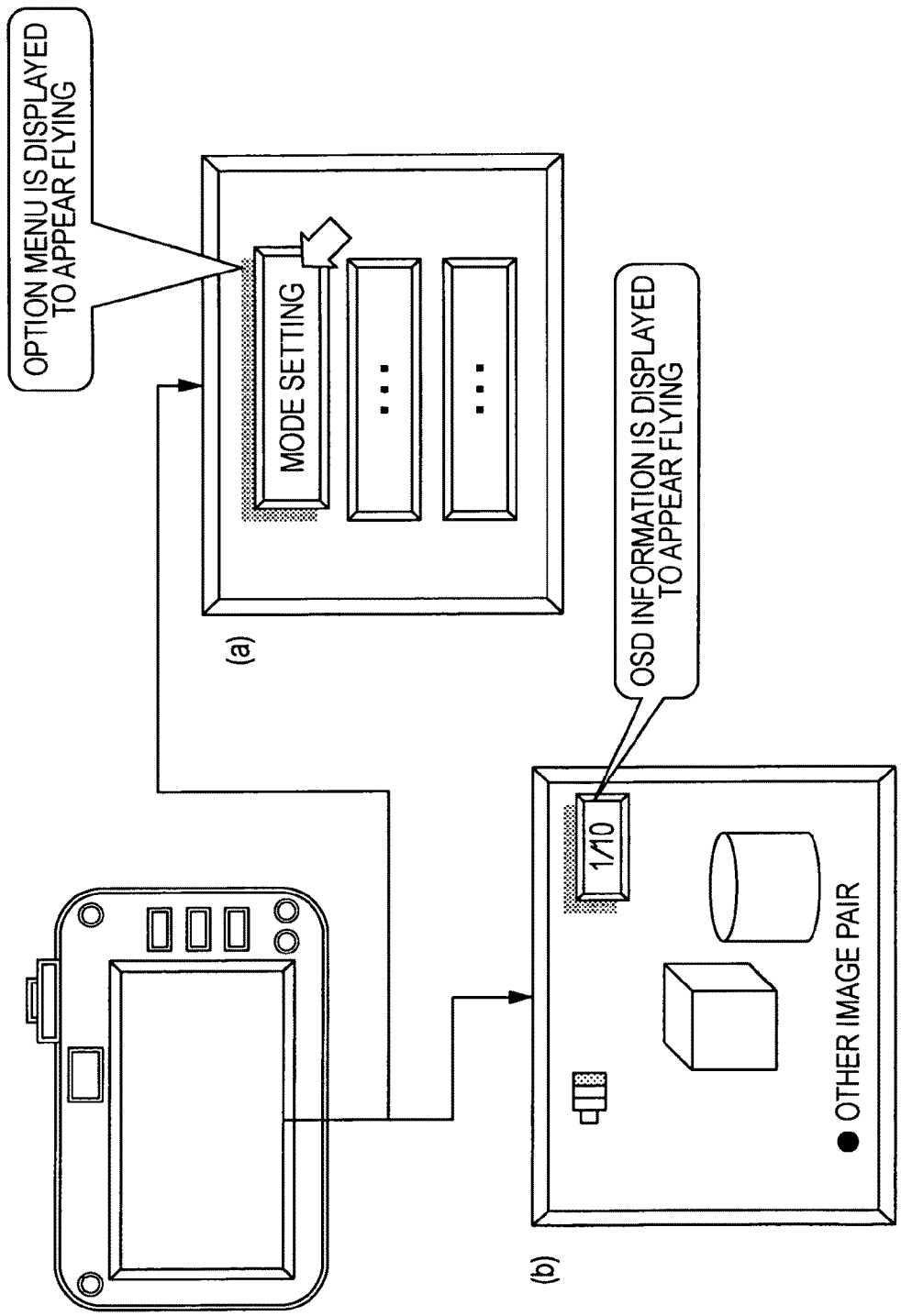

CAPTURING DEVICE, IMAGE PROCESSING METHOD, AND PROGRAM

CROSS-REFERENCE TO RELATED APPLICATION

The present application claims priority from Japanese Patent Application No. JP 2009-241238 filed in the Japanese Patent Office on Oct. 20, 2009, the entire content of which is incorporated herein by reference.

BACKGROUND OF THE INVENTION

1. Field of the Invention

The present invention relates to a capturing device, an image processing method, and a program. More particularly, the present invention relates to a capturing device which changes between images displayed on a display section (monitor) of the capturing device to stereoscopic images (3D images) and flat images (2D images) according to a state of the device and displays the images, an image processing method, and a program.

2. Description of the Related Art

In recent years, capturing devices (cameras) have been developed which take images from plural viewpoints which enable display of stereoscopic images (3D images) as three-dimensional images. Such capturing devices take images from different viewpoints, for example, images for a left eye and images for a right eye. In addition, there have been also proposed devices which can display 3D images on monitors which are display sections provided in capturing devices.

For example, in Japanese Patent No. 3935812 or Japanese Unexamined Patent Application Publication No. 2001-251403, there is disclosure of a configuration of a display section where stereoscopic images (3D images) can be displayed with the naked eye. As disclosed in the related arts, the stereoscopic images can be viewed with the naked eye by using a display configuration having polarizers or lenticular lenses, or by using a display configuration employing an image splitter type.

In addition, Japanese Patent No. 3935812 discloses the configuration where images displayed on the display section can be freely changed to a display for stereoscopic images (3D images) and a display for flat images (2D images) by user operated keys which can be operated by the user.

Also, Japanese Unexamined Patent Application Publication No. 2001-251403 discloses the configuration where positions of images displayed on the display section are changed by user operated slide switches which can be operated by the user, such that a stereoscopic effect in 3D image display (stereoscopic display) is changed.

As described above, many configurations are proposed where 2D images and 3D images can be changed and displayed using a single display section.

However, the configurations disclosed in Japanese Patent No. 3935812 and Japanese Unexamined Patent Application Publication No. 2001-251403 have a problem in that an image displayed on the display section fails to change its display mode without the operation of a user. That is to say, when images displayed on the display section are 3D images, if these are to be changed to 2D images, it is necessary for a user to operate an input section such as switches and the like provided in the device. It is also necessary for a user to operate the input section in a case where 2D images are changed to 3D images.

However, for example, when a focus adjustment is performed, there are cases where whether or not focus is correct may be confirmed while viewing the image displayed on the monitor, but, at this time, when images displayed on the monitor are stereoscopic images (3D images), it is difficult to confirm that the capturing device is in focus.

SUMMARY OF THE INVENTION

It is desirable to provide a capturing device capable of automatically changing and displaying stereoscopic images (3D images) and flat images (2D images) according to a state of the device having a display section, an image processing method, and a program.

It is also desirable to provide a capturing device capable of easily performing focus adjustment by automatically changing a monitor display image to a flat image (2D), for example, during focusing or during manual focus adjustment, an image processing method, and a program.

According to a first embodiment of the invention, there is provided a capturing device including a display section that changes between and displays a three-dimensional (3D) image and a two-dimensional (2D) image; and a controller that performs an image display control for the display section, wherein the controller changes a display mode of an image displayed on the display section, from a 3D image display to a 2D image display, in accordance with preset setting information, at the time of performing a focus control process.

The controller may change the display mode of the image displayed on the display section in accordance with the setting information based on the determination that focusing has been performed, at the time of performing the focus control process.

The controller may change the display mode of the image displayed on the display section in accordance with the setting information based on the determination that a manual focus control has started, at the time of performing the focus control process.

In addition, the capturing device may further include a setting of a 3D image display and a setting of a 2D image display as the setting information, and the controller may change a display of an image displayed on the display section from the 3D image display to the 2D image display at the time of performing the focus control process, when the setting information is set to the 2D image display.

Further, the controller may select an image corresponding to a dominant eye from a left eye image or a right eye image in accordance with dominant eye information included in preset setting information and displays the image, when a 2D image is displayed on the display section.

The capturing device may further include a setting of a 3D image display, a setting of a 2D image display, and a setting of an alternating display of a left eye image and a right eye image as setting information, and the controller may change a display of an image displayed on the display section from the 3D image display to the alternating display at the time of performing the focus control process, when the setting information is set to the alternating display.

In addition, the capturing device may further include a view finder which can display a 2D image, and the controller may perform a 2D image display of an image corresponding to a dominant eye or an alternating display of a left eye image and a right eye image, in accordance with the setting information, when an image is displayed on the view finder.

Also, the capturing device may further include a sensor which detects a position of a face of a user who is viewing through the view finder, and the controller may determine whether a dominant eye of the user is a left eye or a right eye based on detection information of the sensor and register the determined dominant eye information as the setting information.

According to another embodiment of the invention, there is provided an image processing method which performs a display control for a display section of a capturing device, wherein the display section of the capturing device changes between and displays a 3D image and a 2D image, the method including the steps of determining by the controller whether or not focusing has been performed at the time of a focus control process, or whether or not a manual focus control has started; and changing a display mode of an image displayed on the display section, from a 3D image display to a 2D image display, in accordance with preset setting information, when the controller has confirmed the focusing or the starting of the manual focus control.

According to further another embodiment of the invention, there is provided a program which executes a display control for a display section of a capturing device, wherein the display section of the capturing device changes between and displays a 3D image and a 2D image, the program executing the steps of: determining by the controller whether or not focusing has been performed at the time of a focus control process, or whether or not a manual focus control has started; and changing a display mode of an image displayed on the display section, from a 3D image display to a 2D image display, in accordance with preset setting information, when the controller has confirmed the focusing or the starting of the manual focus control.

The program according to an embodiment of the invention can be provided to, for example, information processing devices or computer systems which can execute various program codes, by storage media or communication media which provide the program in a computer readable format. Such a program is provided in a computer readable format to perform a process according to the program on the information processing devices or the computer systems.

Other features or advantages of the invention are shown throughout the detailed description based on embodiments of the invention described later or the accompanying drawings. In addition, the system in this specification has a logical set configuration of plural devices, and the respective configurations of the devices are not limited to be placed in the same case.

According to an embodiment of the invention, in a capturing device having a display section which changes between and displays a 3D image and a 2D image, it is determined whether or not focusing has been performed at the time of a focus control processing, or whether or not a manual focus control has started, and when the focusing has been performed or the manual focus control has started, a display mode of an image displayed on the display section is changed in accordance with preset setting information. Specifically, the change is carried out from a 3D image display to a 2D image display. By this process, it is possible to more reliably confirm the focusing.

BRIEF DESCRIPTION OF THE DRAWINGS

FIGS. 2A and 2B are diagrams illustrating a configuration of processing images taken from a plurality of different viewpoints in a capturing device according to an embodiment of the invention.

FIG. 4 is a diagram illustrating an example of a hardware configuration of a capturing device according to an embodiment of the invention.

FIG. 5 is a diagram illustrating an example of a configuration of a dominant eye detection sensor of a capturing device and the processing thereof according to an embodiment of the invention.

FIG. 8 is a diagram illustrating an example of a display process of a menu and OSD information for a display section (monitor) of a capturing device according to an embodiment of the invention.

DESCRIPTION OF THE PREFERRED EMBODIMENTS

Hereinafter, a capturing device, an image processing method, and a program according to embodiments of the invention will be described with reference to the drawings. The description will be made in the following order.

1. Configuration example of a capturing device
2. Display mode setting process of a capturing device
3. Detailed examples of photographing and reproduction process performed by a capturing device

1. Configuration Examples of a Capturing Device

First, a configuration example of a capturing device according to an embodiment of the invention will be described with reference to FIGS. 1A and 1B.

Figure 1B:
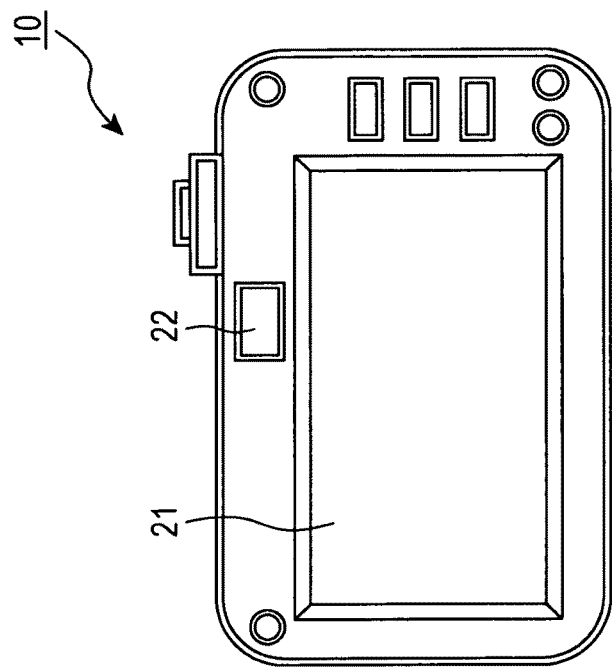
FIGS. 1A and 1B are diagrams illustrating an example of an appearance configuration of a capturing device according to an embodiment of the invention.
Figure 1A:
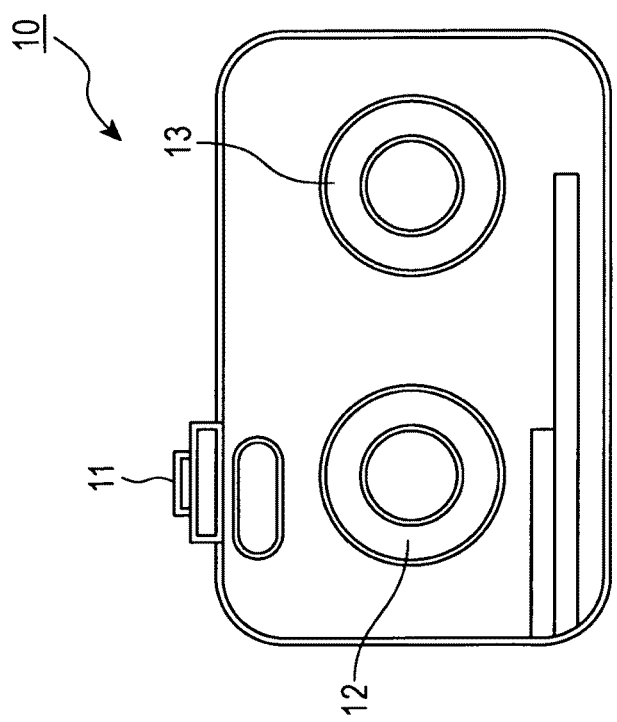

FIGS. 1A and 1B are diagrams illustrating an appearance of a capturing device 10 according to an embodiment of the invention. FIG. 1A is a front view of the capturing device 10, and FIG. 1B is a rear view thereof. The capturing device 10 has a configuration where images for use in displaying stereoscopic images (3D images) as three-dimensional images can be taken. In other words, the capturing device 10 takes a plurality of images from different viewpoints. As shown in FIG. 1A, two lenses 12 and 13 respectively take images from left and right viewpoints.

In a three-dimensional image taking mode, images from two different viewpoints are taken via lenses 12 and 13 by a user pressing a shutter 11. The taken images are recorded in a memory inside the capturing device, and three-dimensional images, that is, stereoscopic images (3D images) using the images from the two different viewpoints are displayed.

As shown in the rear view of FIG. 1B, the rear face of the capturing device 10 is provided with a display section (monitor) 21 which displays images obtained via the lenses 12 and 13 of the capturing device. The display section 21 displays preview images which are images obtained via the lenses 12 and 13 by the operation of a user, images which have been taken and recorded in the memory, and a menu or a manual for operation.

The rear face of the capturing device 10 is also provided with an EVF (electronic view finder) 22 which is a view finder through which a user views at the time of photographing. A user selectively uses either the display section (monitor) 21 or the EVF 22 in deciding a photographing angle or the like, confirms an image of an object which is to be photographed, operates the shutter 11, and performs the photographing.

Although the configuration example having the two lenses 12 and 13 spaced apart from each other is shown in FIGS. 1A and 1B, it is possible to take images from two different viewpoints using a single lens. An example of such a device will be described with reference to FIGS. 2A and 2B.

FIG. 2A shows the configuration example having the two lenses described with reference to FIGS. 1A and 1B. Input object images are taken from two different viewpoints indicated by the arrows 31 and 32. As a result, taken images 35 including the images from two different viewpoints can be obtained.

On the other hand, FIG. 2B shows a configuration where a stereo adapter 40 is installed in front of a single lens. The inside of the stereo adapter 40 is provided with a plurality of reflection plates (mirrors). Input object images from two different viewpoints indicated by the arrows 41 and are reflected by the reflection plates (mirrors) in the stereo adapter 40, and are taken via the single lens. Thereby, taken images 45 including the images from two different viewpoints can be obtained. As such, the capturing device capable of taking stereoscopic images may have various configurations, and thus the capturing device according to an embodiment of the invention may employ various types of devices.

As described with reference to FIG. 1B, in the rear face of the capturing device 10, there is provided the display section (monitor) 21. The display section 21 displays a preview image, images which have been taken and recorded in the memory, and further a menu for a user's operation, and the like.

In addition, in the rear face of the capturing device 10, there is provided the EVF (electronic view finder) 22 which is a view finder through which a user views at the time of photographing.

Figure 3B:
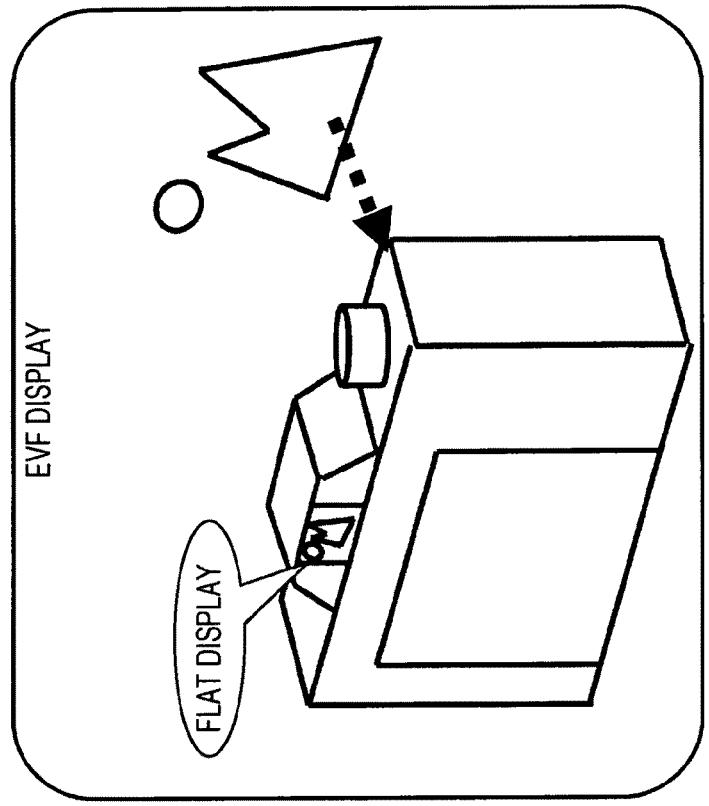
FIGS. 3A and 3B are diagrams illustrating an example of a display process for a display section (monitor) and an EVF of a capturing device according to an embodiment of the invention.
Figure 3A:
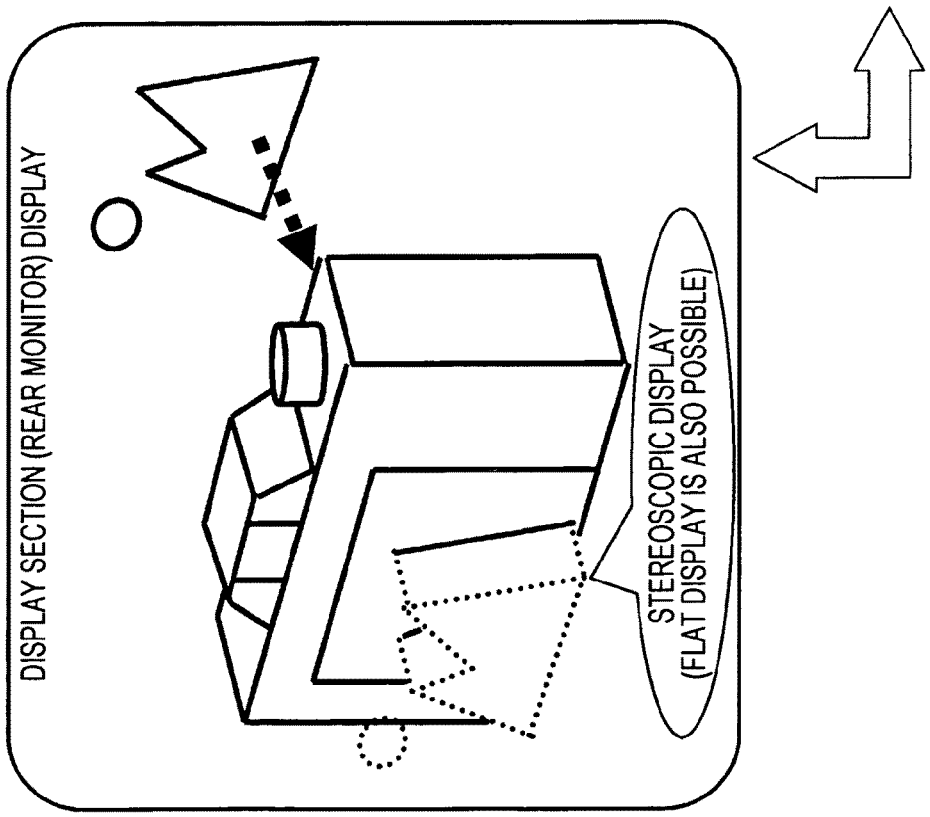

As shown in FIGS. 3A and 3B, the display section (monitor) 21 has a configuration where both stereoscopic images (3D images) of three dimensional images and flat images (2D images) of two dimensional images can be displayed. The process for changing between 2D and 3D display will be described in detail later. The EVF 22 can display flat images (2D images) of two dimensional images. The display section (monitor) 21 has a display configuration including, for example, polarizers or lenticular (prism sheets), or a display configuration including a parallax barrier such as an image splitter or the like, and enables stereoscopic images (3D images) to be viewed with the naked eye at the time of displaying the stereoscopic images.

Next, an internal configuration example of the capturing device 10 according to an embodiment of the invention will be described with reference to FIG. 4. The capturing device according to an embodiment of the invention includes a lens section 111 where an object image is input, a photoelectric conversion section 112 having a photographing element which converts an optical signal input via the lens section into an electric signal, and a signal processing section 113 which receives the electric signal generated from the photoelectric conversion section 112, and performs a signal process. In addition, the lens section 111 may employ the configuration having a plurality of lenses or a single lens as described with reference to FIGS. 1A, 1B, 2A and 2B, and can take images from plural viewpoints.

The signal processing section 113 performs various signal processes such as, for example, a white balance adjustment process, a γ correction process, an interpolation process, or the like. According to, for example, an Mp (multi picture) format, a controller 117 generates an Mp file in which images are recorded in an order of left eye images and right eye images based on a process result in the signal processing section 113, and generates data for stereoscopic image display according to DCF (design rule for camera file system).

Images which are a result of the process in the signal processing section 113 are displayed on the display section (monitor) 121 and the EVF (electronic view finder) 122. In addition, in photographing, the images are stored in a storage section 115 or an external memory 116. Here, for a device which does not support the Mp format, storing methods of image data may employ various methods as well as an independent format of stereoscopic images using a maker note of exif (exchangeable image file format).

An operation input 114 has a shutter 131, an EVF changing section 132, a focus adjustment section 133, and a mode and display setting section 134. In addition thereto, there are many operation sections. Images are taken by operating the shutter 131. The EVF changing section 132 is an ON/OFF switch of an image display for an EVF 122 which is a view finder. When an image display is performed on the EVF 122, it may be performed along with a process of erasing a display on the display section (monitor) 121. The focus adjustment section 133 is controlled by a user's operation, that is, it is used in manually adjusting a focus. Also, the capturing device 10 has an AE (automatic exposure adjustment) function and an AF (automatic focus adjustment) function, so it can take images using such automatic control functions and can also photograph by the manual control.

The mode and display setting section 134 is an operation section for use in, for example, changing a photographing mode of 3D images and a photographing mode of 2D images, changing various photographing modes such as indoors, outdoors, night scene, and the like, and setting a display mode of an image display for the display section (monitor) 121 or the EVF 122. The mode and display setting section 134 is also used in performing settings such as changing an automatic photographing mode using the above-described AE and AF functions and a manual mode.

A controller (CPU) 117 controls the processes in the capturing device, such as the photographing process by the capturing device, the image display process for the display section (monitor) 121 or the EVF 122, or the like. In addition, programs used in the control are stored in, for example, an ROM 118, and the controller (CPU) 117 performs various kinds of processes in accordance with the programs.

ARAM 119 is used as a work area in the processing by the controller (CPU) 117, and is used as a storage area for various pieces of setting information. Further, it temporarily stores images or various kinds of data. When the controller (CPU) 117 executes the programs stored in the ROM 118, it develops the programs in the RAM 119 and performs processes in accordance with the programs.

The display section (monitor) 121 corresponds to the display section (monitor) 21 shown in FIG. 1B. For example, it is constituted by a liquid crystal display. The display section (monitor) 121 displays images (preview images) obtained via the lens section 111. In addition, the display section 121 displays images which have been taken, read from the storage section 115 or the external memory 116, and the display section 121 displays a menu screen or an operation screen, or the like. The display section (monitor) 121 may have, for example, a touch panel function, and may function as a user input section.

The display section (monitor) 121 can change and display stereoscopic images (3D images) and flat images (2D images). As described above, the display section (monitor) 121 has a display configuration including, for example, polarizers or lenticular (prism sheets) as described above, or a display configuration including a parallax barrier such as an image splitter or the like, and enables stereoscopic images to be viewed with the naked eye.

The change of display of stereoscopic images (3D images) and flat images (2D images) on the display section (monitor) 121 is carried out automatically based on a state of the capturing device under the control of the controller 117. This will be described in detail later.

The EVF 122 corresponds to the EVF 22 shown in FIG. 1B, and is constituted by, for example, a liquid crystal display. The EVF 122 displays images (preview images) obtained via the lens section 111 by operating the EVF changing section 132.

As described above, a user can selectively use one of the display section (monitor) 121 and the EVF 122 which is a view finder in deciding a photographing angle or the like, confirm an object image, and perform photographing.

A power supply 123 is a section which supplies power to the capturing device, and is equipped with, for example, a battery.

A sensor 124 determines whether a dominant eye is a left eye or a right eye by determining a user's eye viewing through the EVF 122 or a position of a user's face. The controller 117 receives detection information from the sensor 124 to determine an eye viewing through the EVF 122, and determines that the eye is a dominant eye.

A configuration example of the sensor 124 will be described with reference to FIG. 5. The sensor 124 is constituted by, for example, optical sensors disposed at both end portions of left and right of the capturing device. FIG. 5 shows sensors L151 and R152.

As shown in (A) of FIG. 5, when a user views through the EVF 122 with a right eye, the sensors L151 and R152 are covered and hidden by a face area 201. On the other hand, as shown in (B) of FIG. 5, when a user views through the EVF 122 with a left eye, only the sensor R152 is covered and hidden by the face area 201. The face area 201 shows the back of the user's head.

With which eye a user views through the EVF 122 is determined by detecting the two states using the sensors L151 and R152. The sensor detection information is input to the controller 117 which determines whether an eye viewing through the EVF 122 is a left eye or a right eye based on the sensor detection information in accordance with preset programs, and the eye is determined to be a dominant eye. The example shown in FIG. 5 is a configuration example of the sensor, and other configurations may be employed.

As described above, the display section (monitor) 121 has a configuration where stereoscopic images (3D images) and flat images (2D images) can be changed and displayed. The display section 121 has a display configuration including polarizers or lenticular (prism sheets), or a display configuration including a parallax barrier such as an image splitter or the like. When stereoscopic images (3D images) are displayed on the display section (monitor) 121, a display process is performed for the display section (monitor) 121 by using two images, a left eye image (L image) and a right eye image (R image). A user views the display section (monitor) 121 with two eyes, but the display process is performed such that only the left eye image (L image) is viewed by the left eye of the user and only the right eye image (R image) is viewed by the right eye of the user. By this process, the user views the images as stereoscopic images (3D images).

When flat images (2D images) are displayed on the display section (monitor) 121, either the R image or the L image is supplied to the display section (monitor) 121. In this case, the user views planar flat images (2D images).

The EVF 122 which is a view finder is viewed through with only one eye, and does not display stereoscopic images. Either the R image or the L image is supplied to the EVF 122. In this case, the user views planar flat images (2D images).

Such selective supply of images will be described with reference to FIGS. 6 and 7A and 7B. Data displayed on the display section (monitor) 121 or the EVF 122 is, for example, image data (preview image) obtained via the lens section 111, image data which has been taken and recorded in the storage section 115 and the external memory 116, menu data, or the like. There are cases where the menu data or the like is read from the ROM 118.

These display controls are performed by the controller 111. When images are displayed on the display section (monitor) 121 or the EVF 122, image data scheduled to be displayed is temporarily stored (buffered) in the RAM 119, as shown in FIG. 6. Thereafter, the image data is supplied to the display section (monitor) 121 or the EVF 122 from the RAM 119.

Figure 6:
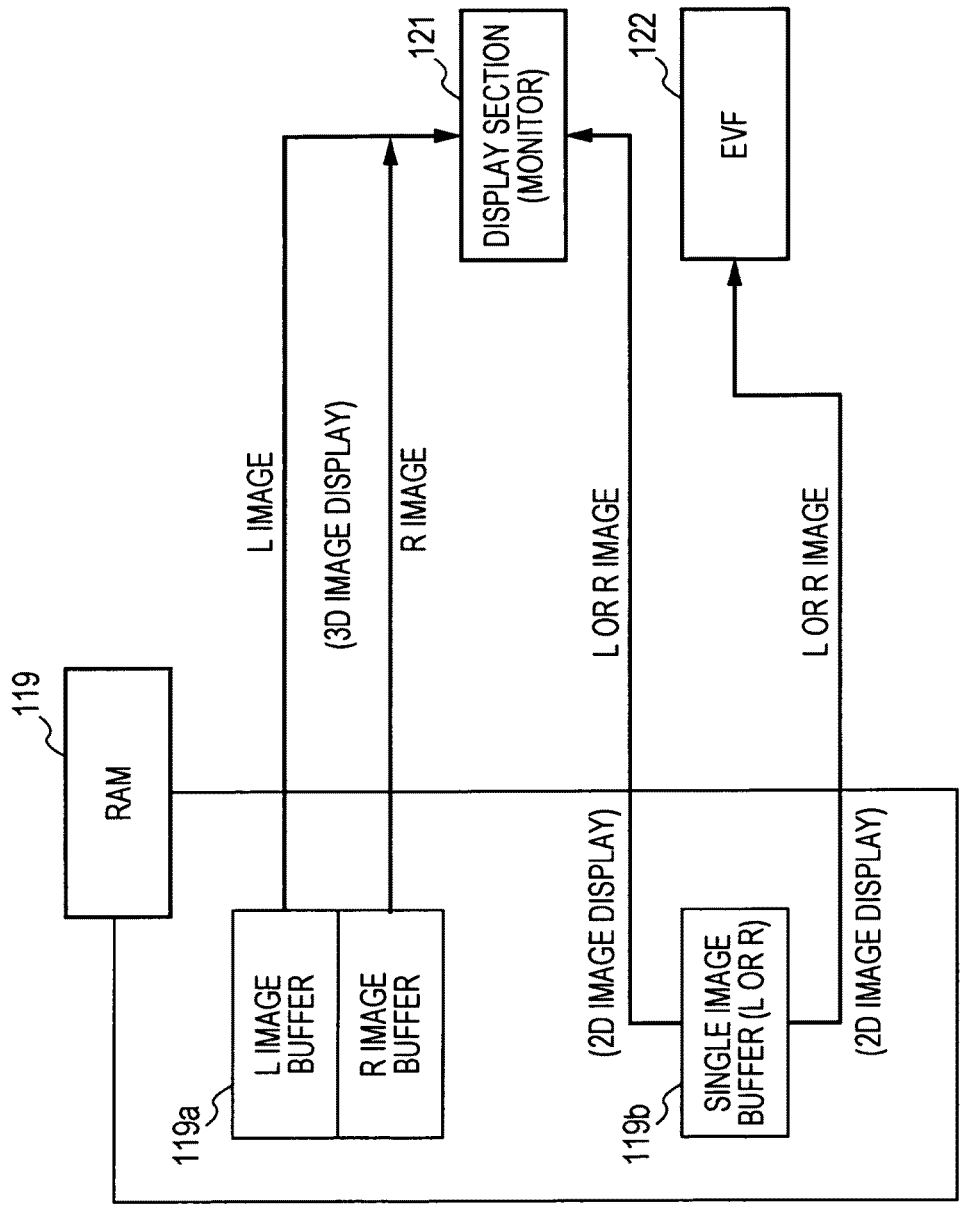
FIG. 6 is a diagram illustrating an example where image data is stored in an RAM of a capturing device according to an embodiment of the invention.

When stereoscopic images (3D images) are displayed on the display section (monitor) 121, as shown in RAM 119(a) of FIG. 6, the RAM 119 is divided into two areas, an L image buffer and an R image buffer, which respectively store the left eye image (L image) and the right eye image (R image). These two images are supplied to the display section (monitor) 121 to display stereoscopic images (3D images).

On the other hand, when flat images (2D images) are displayed on the display section (monitor) 121, as shown in an RAM 119(b) of FIG. 6, the RAM 119 is set as a single image buffer which stores either the L image or the R image. The single image is supplied to the display section (monitor) 121 to display a flat image (2D image).

The EVF 122 which is a view finder is viewed through by only one eye and does not display stereoscopic images. Therefore, when an image is displayed on the EVF 122, as shown in the RAM 119(*b*) of FIG. 6, the RAM 119 is set as a single image buffer which stores either the L image or the R image. The single image is supplied to the EVF 122 to display a flat image (2D image).

Figure 7B:
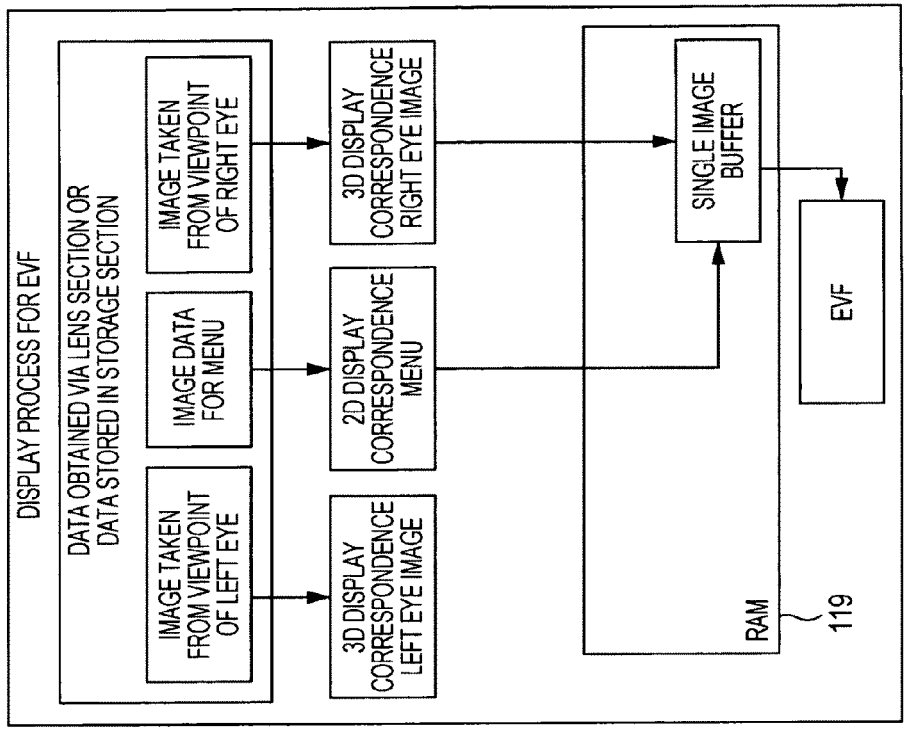
FIGS. 7A and 7B are diagrams illustrating an example of a display process for a display section (monitor) and an EVF of a capturing device according to an embodiment of the invention.
Figure 7A:
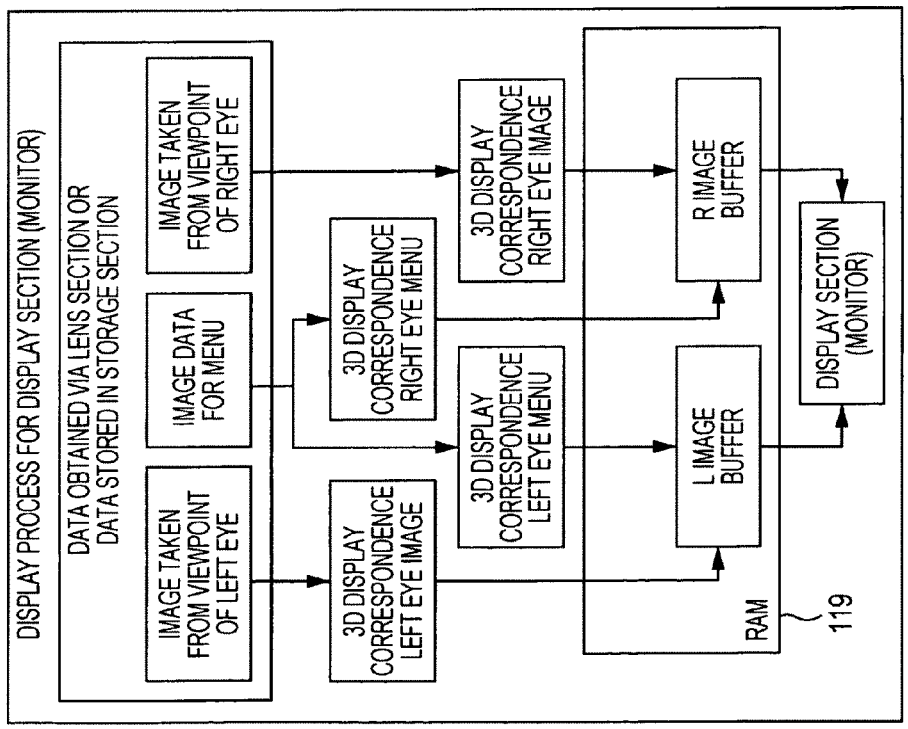

With reference to FIGS. 7A and 7B, an example of using a RAM will be described when a display process is performed for the display section (monitor) 121 and the EVF 122.

FIG. 7A shows a flow of data in a display process for the display section (monitor) and FIG. 7B shows a flow of data in a display process for the EVF.

First, a display process for the display section (monitor) will be described with reference to FIG. 7A.

A sequence shown in FIG. 7A shows a display process sequence of stereoscopic images (3D images) for the display section (monitor).

Among data displayed on the display section (monitor), data which is displayed as stereoscopic images (3D images) is an image (preview image) obtained via the lens section, images which have been taken, stored in the storage section, or a menu image stored in the storage section including the ROM.

The uppermost data shown in FIG. 7A indicates data which is displayed as stereoscopic images (3D images). This data includes, as shown in the figure, images taken from the viewpoint of a left eye, images taken from the viewpoint of a right eye, and image data for a menu. The capturing device according to an embodiment of the invention can display a menu as stereoscopic images (3D images).

An example of displaying a menu as stereoscopic images will be described with reference to FIG. 8. Specifically, as shown in FIG. 8, a menu or OSD (on screen display) information displayed on the display section (monitor) is displayed as stereoscopic images. For example, the display is performed in such a manner that menu data selected by a user as shown in (a) of FIG. 8, or specific OSD information as shown in (b) of FIG. 8 is viewed to be positioned in front of other data. This display is performed by using left eye data and right eye data like a typical stereoscopic image display, for example, menu image data for a left eye and menu image data for a right eye.

In the ROM or the storage section of the capturing device, image data for stereoscopic display, such as menu image data for a left eye, menu image data for a right eye, OSD information image data for a left eye, OSD information image data for a right eye are stored in advance. For example, when the stereoscopic display as shown in (a) of FIG. 8 is performed, the display process is carried out by using the menu image data for a left eye and the menu image data for a right eye.

Referring to FIG. 7A again, the display process for the display section (monitor) will be described with reference to FIG. 7A.

The display data shown in the uppermost in FIG. 7A is supplied to the RAM 119. When stereoscopic images are displayed, the RAM 119 is divided into the L image buffer and the R image buffer as described with reference to FIG. 6.

When stereoscopic images are displayed, the L image buffer of the RAM 119 stores 3D display images which correspond to a left eye generated based on images taken from the viewpoint of a left eye, and the R image buffer of the RAM 119 stores 3D display images which correspond to a right eye generated based on images taken from the viewpoint of a right eye. The 3D display images which correspond to a left eye and the 3D display images which correspond to a right eye stored in the RAM 119 are displayed on the display section (monitor) to perform the display process of the stereoscopic images (3D images).

In addition, when the menu is displayed as stereoscopic images as shown in FIG. 8, the L image buffer of the RAM 119 stores 3D display menu images which correspond to a left eye, and the R image buffer of the RAM 119 stores 3D display menu images which correspond to a right eye. These images are data in advance stored in the ROM or the storage section of the capturing device.

The 3D display menu images which correspond to a left eye and the 3D display menu images which correspond to a right eye stored in the RAM 119 are displayed on the display section (monitor), and thus the menu display process as the stereoscopic images (3D images) is performed.

Here, FIG. 7B is a diagram illustrating the display process for the EVF. The EVF is viewed through by only one eye, and thus it does not display stereoscopic images. In this case, the RAM 119 is set as a single image buffer for storing either the L image or the R image as described above with reference to FIG. 6. The single image is supplied to the EVF to display a flat image (2D image).

The data shown in the top portion in FIG. 7B is the same as the data shown in FIG. 7A. FIG. 7B shows an example of using only the image taken from the viewpoint of a right eye when the image display is performed. The single image buffer of the RAM 119 stores a right eye image generated based on an image taken from the viewpoint of a right eye. The right eye image stored in the RAM 119 is supplied to the EVF to display a flat image (2D image).

In addition, when the menu is displayed, the single image buffer of the RAM 119 stores a right eye menu image. This image is supplied to the EVF, so the menu display process as a flat image (2D image) is performed.

Also, FIG. 7B shows a process example performed by using the right eye data as the image and the menu, but the left eye data may be used. In addition, the process may be performed by using data corresponding to a dominant eye on the basis of dominant eye information of a user.

The example shown in FIG. 7B shows the display process of a flat image for the EVF, but when the display of a flat image is performed for the display section (monitor), the EVF shown in the bottom portion in FIG. 7B is replaced with the display section (monitor), and the process shown in of FIG. 7B is performed.

2. Display Mode Setting Process of the Capturing Device

As described above, in the capturing device according to an embodiment of the invention, the display section (monitor) changes between and displays stereoscopic images (3D images) and flat images (2D images), and the EVF displays flat images (2D images). In addition, in the case of the flat display (2D display), as described with reference to FIG. 7B, there is the method where either the L image or the R image is continuously displayed, and there is a display mode where the L image and the R image are alternately displayed, for example, at an interval of several seconds. The alternating display is also referred to as a flip display. The alternating display is used, for example, to confirm a left viewpoint image and a right viewpoint image independently.

Which of the display modes of the image display is performed on the display section (monitor) and the EVF may be set by a user in advance. Hereinafter, such a display mode setting process will be described.

Figure 9:
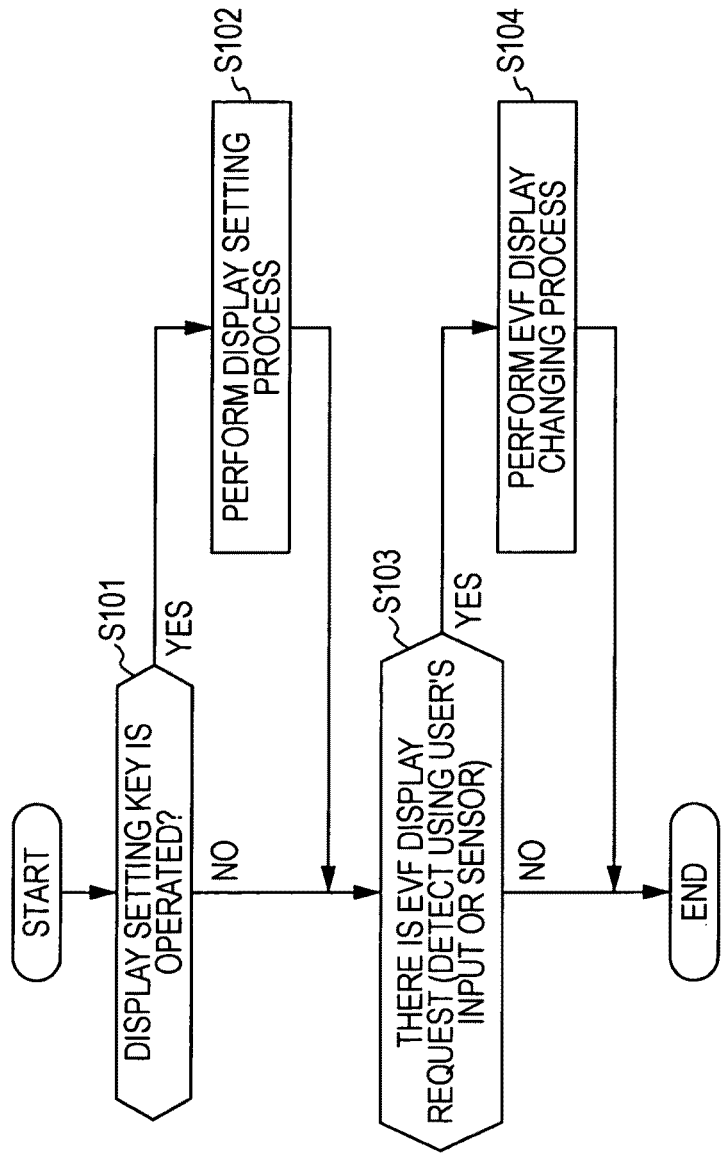
FIG. 9 is a flowchart illustrating a whole sequence of a display setting process performed in a capturing device according to an embodiment of the invention.

FIG. 9 is a flowchart illustrating a whole sequence of the display setting process. A process following the flowchart described below is performed under the control of the controller 117 in accordance with the programs prerecorded in the ROM and the like.

A process at each step in the flow shown in FIG. 9 will be described.

First, at step S101, it is determined whether or not a display setting key is operated. This is a process of detecting, for example, whether or not a key of the mode and display setting section 134 shown in FIG. 4 is operated. If the display setting key is operated, the flow goes to step S102 to perform the display setting process. The display setting process will be described in detail later with reference to FIG. 11. At the time of the display setting process at step S102, several setting menus (refer to FIG. 10) are displayed on the display section such that processes using the menus are performed.

When it is determined that the display setting key is not operated at step S101 and the display setting process at step S102 is completed, the flow goes to step S103. At step S103, it is determined whether or not there is an EVF display request. This is performed by, for example, detecting user operation information for the EVF changing section 132 shown in FIG. 4. Alternatively, it may be performed based on the determination of whether or not a user views through the EVF on the basis of detection information of the sensor 124 shown in FIG. 4. For example, when it is confirmed that a user views through the EVF on the basis of detection information of the sensor described with reference to FIG. 5, it is determined that there is the EVF display request. When it is confirmed that a user does not view through the EVF, it is determined that there is no EVF display request.

When the determination at step S103 is affirmative, that is, it is determined that there is the EVF display request, the flow goes to step S104 to perform the EVF display process. In this case, the display on the display section (monitor) may be stopped. The determination at step S103 is negative, that is, there is no EVF display request, the process ends. The display process for the display section (monitor) is performed when the EVF display process is not performed. The displayed data is, for example, an image (preview image) obtained via the lenses, a menu screen operated by a user, or the like.

Next, the display setting process at step S102 will be described in detail with reference to FIGS. 10 and 11.

Figure 10:
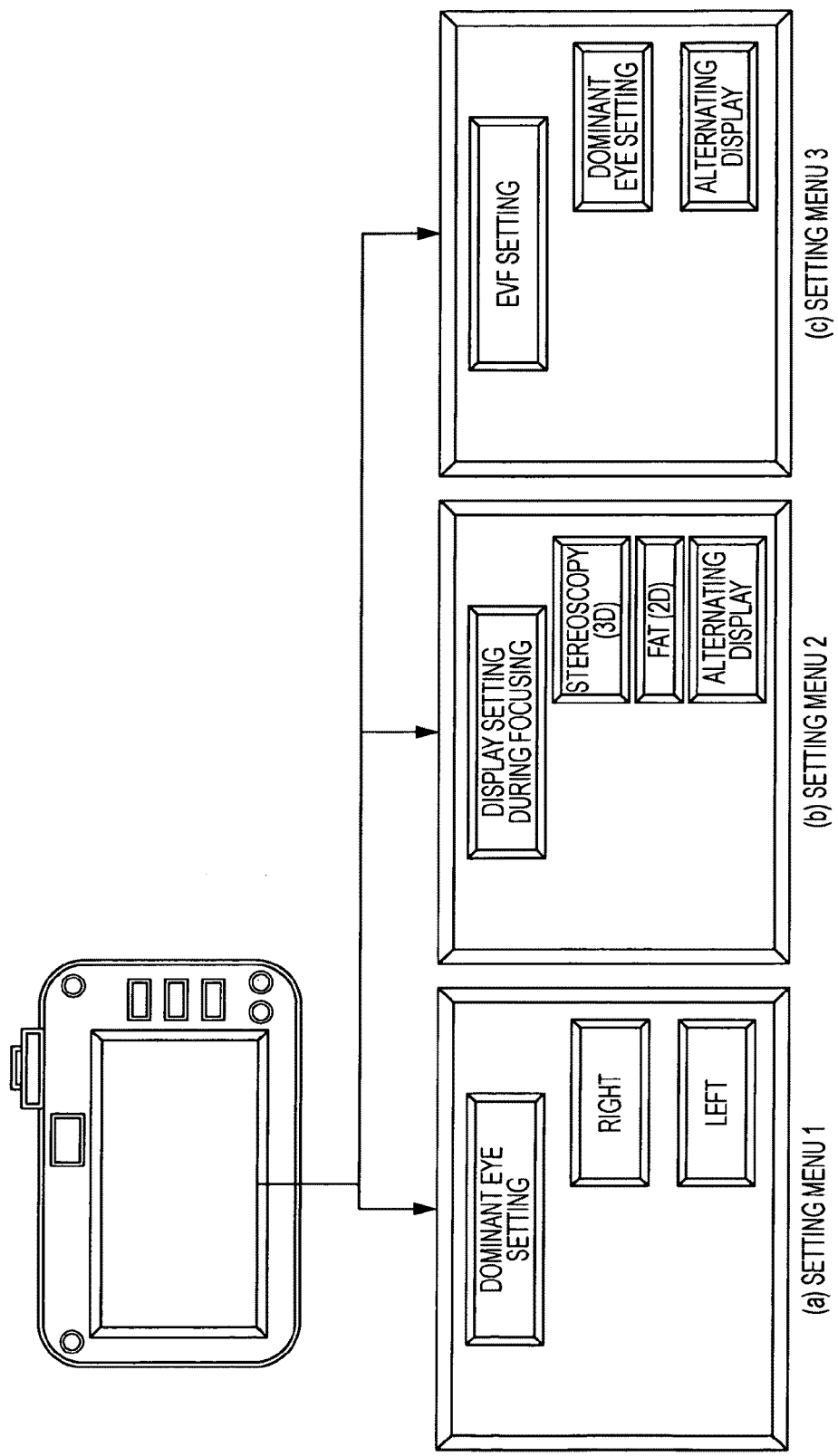
FIG. 10 is a diagram illustrating menus displayed on a display section at the time of a display setting process performed in a capturing device according to an embodiment of the invention.
Figure 11:
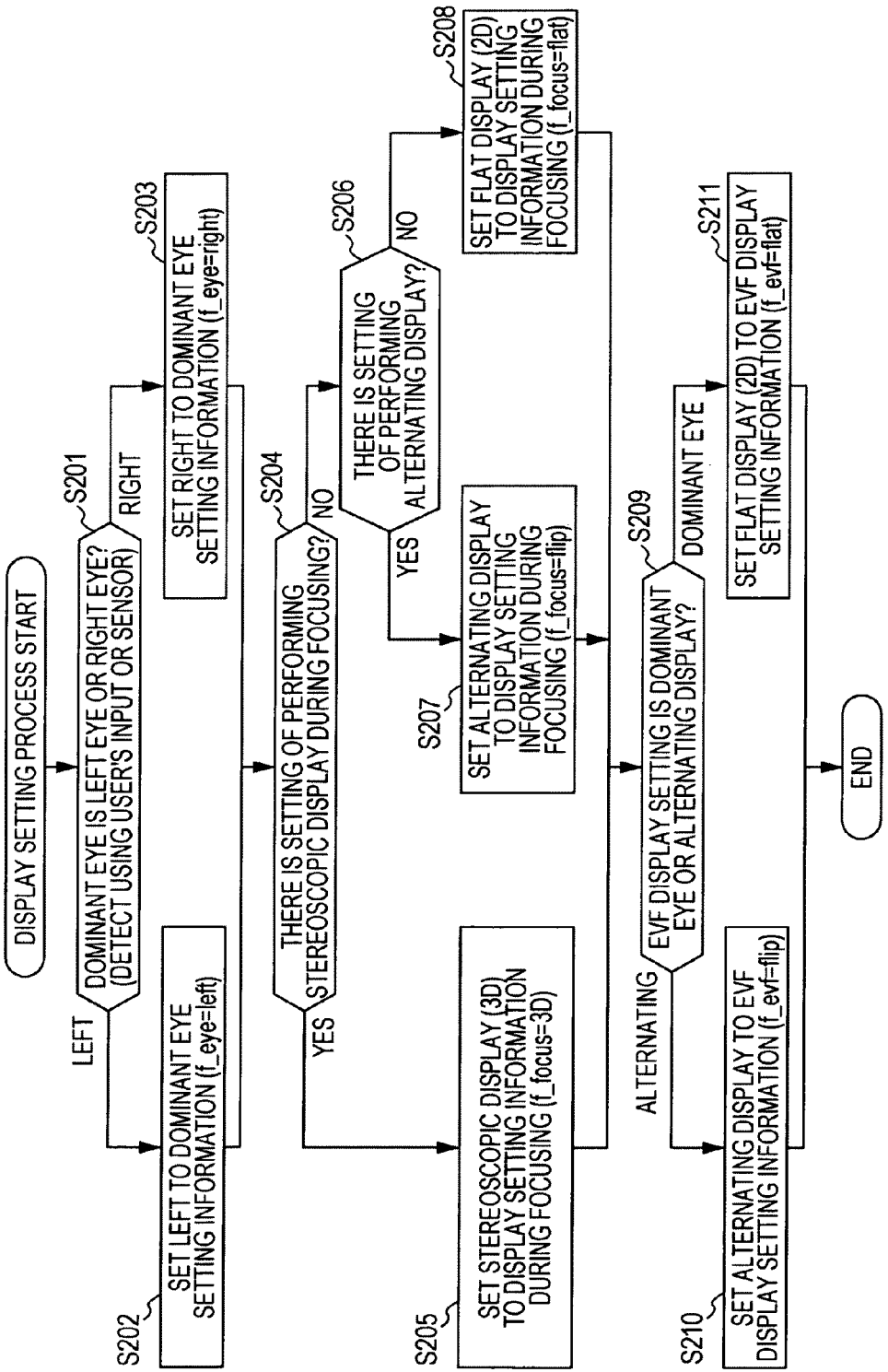
FIG. 11 is a flowchart illustrating a sequence of a display setting process performed in a capturing device according to an embodiment of the invention.

FIG. 10 shows menu screens used in the display setting process. The menu screens are displayed on the display section (monitor), and a user operates the mode and display setting section 134 to decide settings.

A setting menu 1 in (a) of FIG. 10 is a "dominant eye setting menu."

This is a menu for a user inputting dominant eye information. The user inputs "right" or "left" as the dominant eye information. In addition, as described above with reference to FIG. 5, the dominant eye of the user can be determined by sensor detection when viewing through the EVF, so the dominant eye is determined using the sensor detection information instead of the input setting by the user, and the setting may be performed based on the determination information.

A setting menu 2 in (b) of FIG. 10 is a "display setting menu during focusing."

This is a menu for deciding a display mode during focusing of an image (preview image) for the display section (monitor). There are users who wish to confirm only images during focusing by using flat images (2D images) in order to accurately confirm taken images even when normal preview images are displayed as stereoscopic images (3D images). Also, there are users who wish to confirm left viewpoint images and right viewpoint images independently. Therefore, in order to cope with various kinds of demands, in the capturing device according to an embodiment of the invention, images displayed on the display section (monitor) during focusing can be set to be selected from three kinds of display modes, stereoscopic images (3D images), flat images (2D images), and alternating display images (flip).

A setting menu 3 in (c) of FIG. 10 is an "EVF display setting menu."

The EVF does not display stereoscopic images, and images displayed on the EVF can be set to be selected from two kinds of display modes, flat images (2D images) and alternating display images (flip).

A detailed sequence of the display setting process using the menus shown in FIG. 10 will be described with reference to a flowchart shown in FIG. 11. The flowchart shown in FIG. 11 illustrates in detail the process at step S102 of the flow shown in FIG. 9.

A process at each step in the flowchart shown in FIG. 11 will be described.

First, at step S201, it is determined whether the dominant eye of the user is a left eye or a right eye. The determination is carried out based on information which the user inputs in the "dominant eye setting menu" of the setting menu 1 shown in (a) of FIG. 10, or the detection information of the sensor described above with reference to FIG. 5.

When it is determined that the dominant eye of the user is the left eye, the flow goes to step S202, where a flag indicating left is set to dominant eye setting information (f_eye) which is set as recording information of the RAM.

Figure 12:
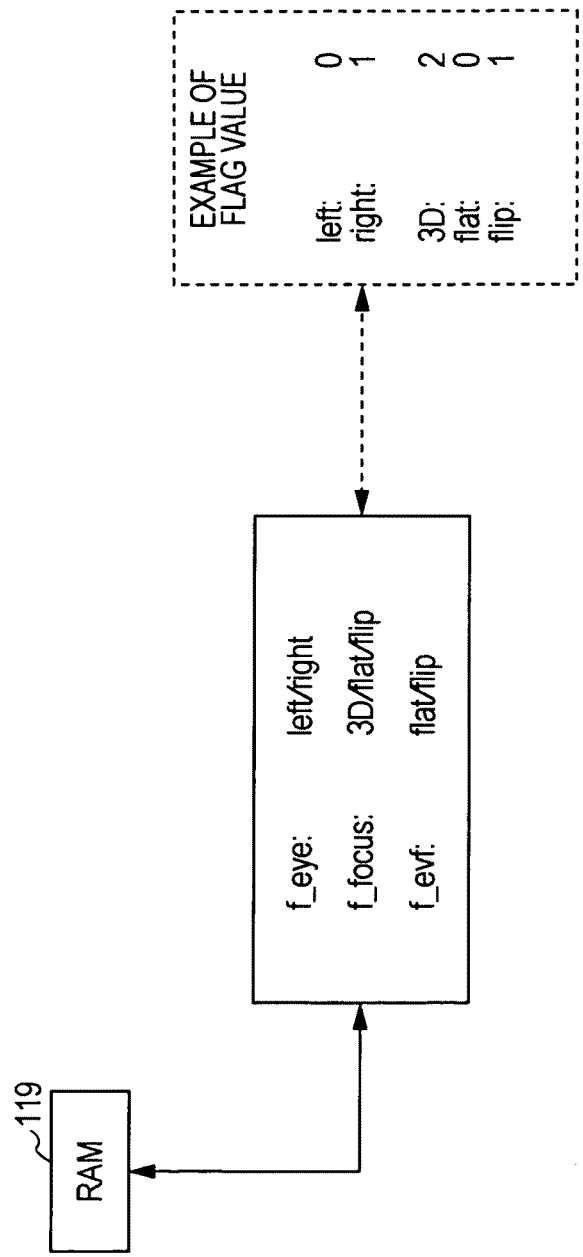
FIG. 12 is a diagram illustrating an example of setting information recorded in an RAM at the time of a display setting process performed in a capturing device according to an embodiment of the invention.

As shown in FIG. 12, the RAM 119 has an area for recording display mode setting information. Specifically, the RAM 119 records setting information including dominant eye setting information (f_eye), display setting information during focusing (f_focus), and EVF display setting information (f_evf). The controller 117 decides a display mode for the display section (monitor) and the EVF based on the setting information and performs the display process.

As shown in FIG. 12, the dominant eye setting information (f_eye) has a configuration where the left eye (left) and the right eye (right) can be set. For example, as a value of the flag, the flag is set either with values corresponding to the left eye (left)=0 or the right eye (right)=1.

The display setting information during focusing (f_focus) has a configuration where stereoscopic display (3D), flat display (2D (flat)), alternating display (flip) can be set. For example, as a value of the flag, the flag is set either with values corresponding to the stereoscopic display (3D)=2, the flat display (2D (flat))=0, or the alternating display (flip)=1. In addition, the flat display (2D (flat)) is performed as a flat display using images of the dominant eye side.

The EVF display setting information (f_evf) has a configuration where dominant eye flat display (2D (flat)) and alternating display (flip) can be set. For example, as a value of the flag, the flag is set either with values corresponding to the dominant eye flat display (2D (flat))=0 or the alternating display (flip)=1.

Referring to the flowchart shown in FIG. 11 again, a process at each step will be described. At step S201, when it is determined that the dominant eye of the user is the left eye, the flow goes to step S202, and a flag indicating the left (left) is set to the dominant eye setting information (f_eye) which is set as recording information of the RAM. Here, at the step S201, when it is determined that the dominant eye of the user is the right eye, the flow goes to step S203, and a flag indicating the right (right) is set to the dominant eye setting information (f_eye) which is set as recording information of the RAM.

Next, it is determined whether or not there is a request for stereoscopic image display during focusing at step S204. The determination is carried out based on information which the user inputs in the "display setting menu during focusing" of the setting menu 2 shown in (b) of FIG. 10. When the user makes a request for "stereoscopy (3D)," the determination at step S204 is affirmative. Otherwise, the determination is negative.

When the user makes a request for "stereoscopy (3D)" and the determination at step S204 is affirmative, the flow goes to step S205.

At step S205, a flag indicating the stereoscopy (3D) is set to the display setting information during focusing (f_focus) which is set as recording information of the RAM.

On the other hand, when the user makes a request for other than the "stereoscopy (3D)" and the determination at the step S204 is negative, the flow goes to step S206.

At step S206, it is determined whether or not there is a request for image alternating display during focusing. The determination is also carried out based on information which the user inputs in the "display setting menu during focusing" of the setting menu 2 shown in (b) of FIG. 10. When the user makes a request for the "alternating display," the determination at step S206 is affirmative. In the case of "flat (2D)," the determination is negative.

When the user makes a request for the "alternating display" and the determination at step S206 is affirmative, the flow goes to step S207.

At step S207, a flag indicating the alternating display (flip) is set to the display setting information during focusing (f_focus) which is set as recording information of the RAM.

On the other hand, when the user makes a request for the "flat (2D (flat))" and the determination at step S206 is negative, the flow goes to step S208.

At step S208, a flag indicating the dominant eye flat display (2D (flat)) is set to the display setting information during focusing (f_focus) which is set as recording information of the RAM.

Next, at step S209, it is determined whether a request for a display mode of the EVF is the "alternating display (flip)" or the "dominant eye display." The determination is carried out based on information which the user inputs in the "EVF display setting menu" of the setting menu 3 shown in (c) of FIG. 10. When the user makes a request for the "alternating display (flip)," the flow goes to step S210, and when the user makes a request for the "dominant eye display," the flow goes to step S211.

When the user makes a request for the "alternating display" and the flow goes to step S210, a flag indicating the alternating display (flip) is set to the EVF display setting information (f_evf) which is set as recording information of the RAM.

Here, when the user makes a request for the "dominant eye display" and the flow goes to step S211, a flag indicating the dominant eye display (2D (flat)) is set to the EVF display setting information (f_evf) which is set as recording information of the RAM.

By the above-described processes, the display setting process is completed.

The following information is recorded as the setting information of the RAM 119 shown in FIG. 12 by the above-described processes.

The RAM 119 records each of the setting registration information, such as the dominant eye information (f_eye)=left eye (left) or right eye (right), the display setting information during focusing (f_focus)=stereoscopic display (3D) or dominant eye flat display (2D (flat)) or alternating display (flip), the EVF display setting information (f_evf)=dominant eye flat display (2D (flat)) or alternating display (flip). The controller 117 performs a display control by using the direction for use at the time of these settings.

3. Detailed Examples of Photographing and Reproduction Process Performed by the Capturing Device Next, detailed examples of photographing and reproduction process performed by the capturing device according to an embodiment of the invention will be described. Particularly, the description will be made mainly based on a display control process for the display section (monitor) and the EVF.

Figure 13:
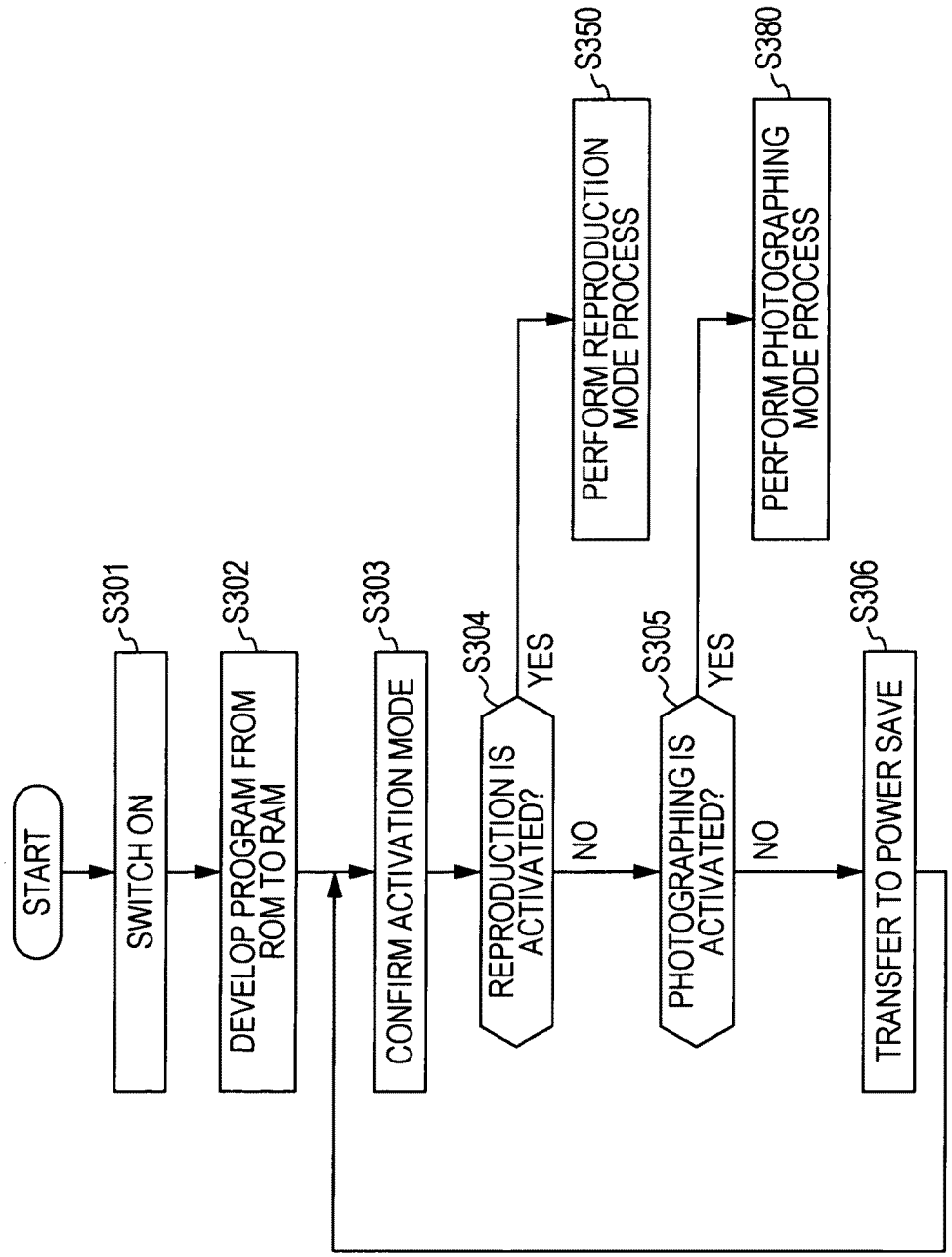
FIG. 13 is a flowchart illustrating a whole sequence of a process performed in a capturing device according to an embodiment of the invention.

FIG. 13 is a flowchart illustrating a whole sequence of an operation performed by the capturing device.

First, at step S301, the capturing device is switched on and starts to be supplied with power from the power supply 123 (refer to FIG. 4).

At step S302, the controller 117 develops programs, which are stored in the ROM 118, in the RAM 119 to start a process according to the developed programs.

At step S303, an activation mode is confirmed. The activation mode includes a photographing mode where a photographing process is performed and a reproduction mode where a reproduction process is performed. When no mode is set, the capturing device is transferred to a power save mode for reducing the supply of power.

At step S304, when the activation mode is determined to be the reproduction mode, the flow goes to step S350 to perform the reproduction mode process.

At step S304, when the activation mode is determined not to be the reproduction mode, the flow goes to the step S305. At step S305, it is determined whether or not the activation mode is in the photographing mode. When the activation mode is determined to be in the photographing mode, the flow goes to step S380 to perform the photographing mode process.

At step S305, when the activation mode is determined not to be in the photographing mode, the flow goes to step S306 to be transferred to the power save mode. Thereafter, processes corresponding to mode changes are sequentially performed.

Figure 14:
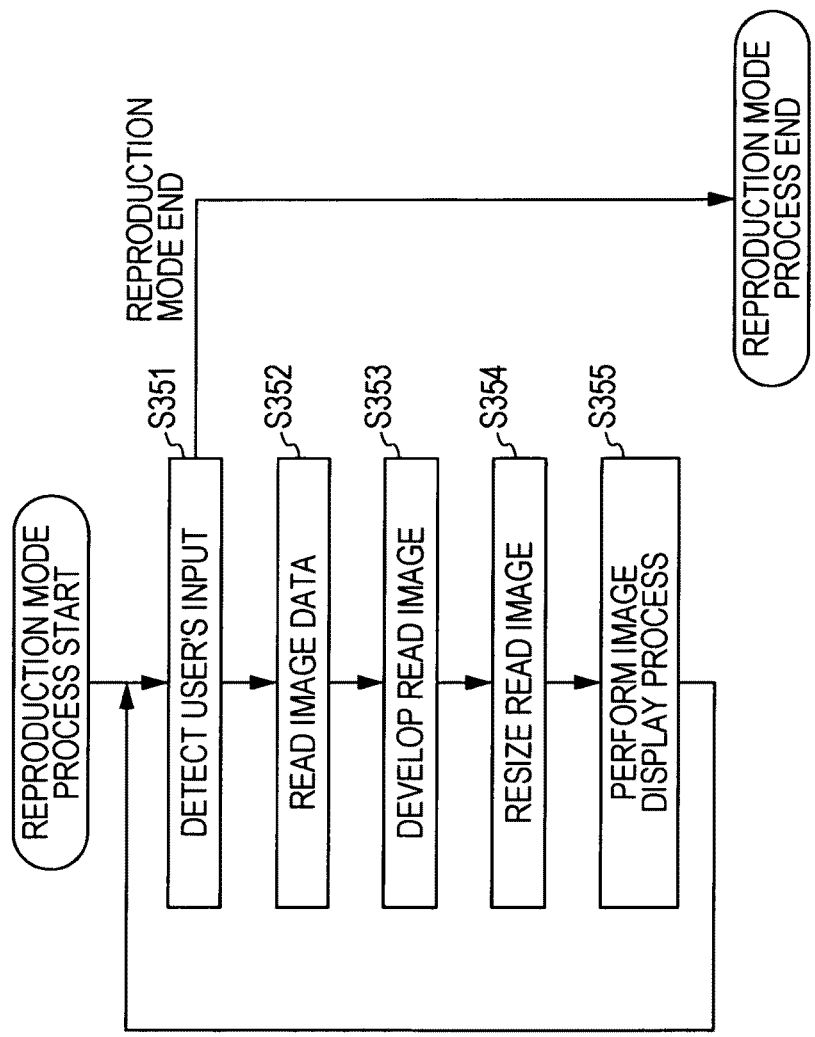
FIG. 14 is a flowchart illustrating a sequence of a reproduction mode process performed in a capturing device according to an embodiment of the invention.

A detailed sequence of the reproduction mode process at step S350 will be described with reference to a flowchart shown in FIG. 14.

At step S351, an input by the user is detected. The input by the user includes, for example, information for designation of reproduced images, a request for the terminating of the reproduction mode, or the like.

For example, if the information for designation of reproduced images is input, image data designated to be reproduced is read from the storage section 115 or the external memory 116 at step S352.

Next, at step S353, the read image data is developed in the RAM 119.

In addition, at step S354, the read image is resized. This is, for example, a size adjustment process of a displayed image, corresponding to the number of images displayed on the display section (monitor) 121.

Thereafter, at step S355, the resized image is displayed on the display section (monitor) 121.

The flow returns to step S351, and, as long as there is no request for the terminating of the reproduction mode, the flow repeats step S352 and thereafter.

If the request for the terminating of the reproduction mode is detected at step S351, the reproduction mode is terminated.

Figure 15:
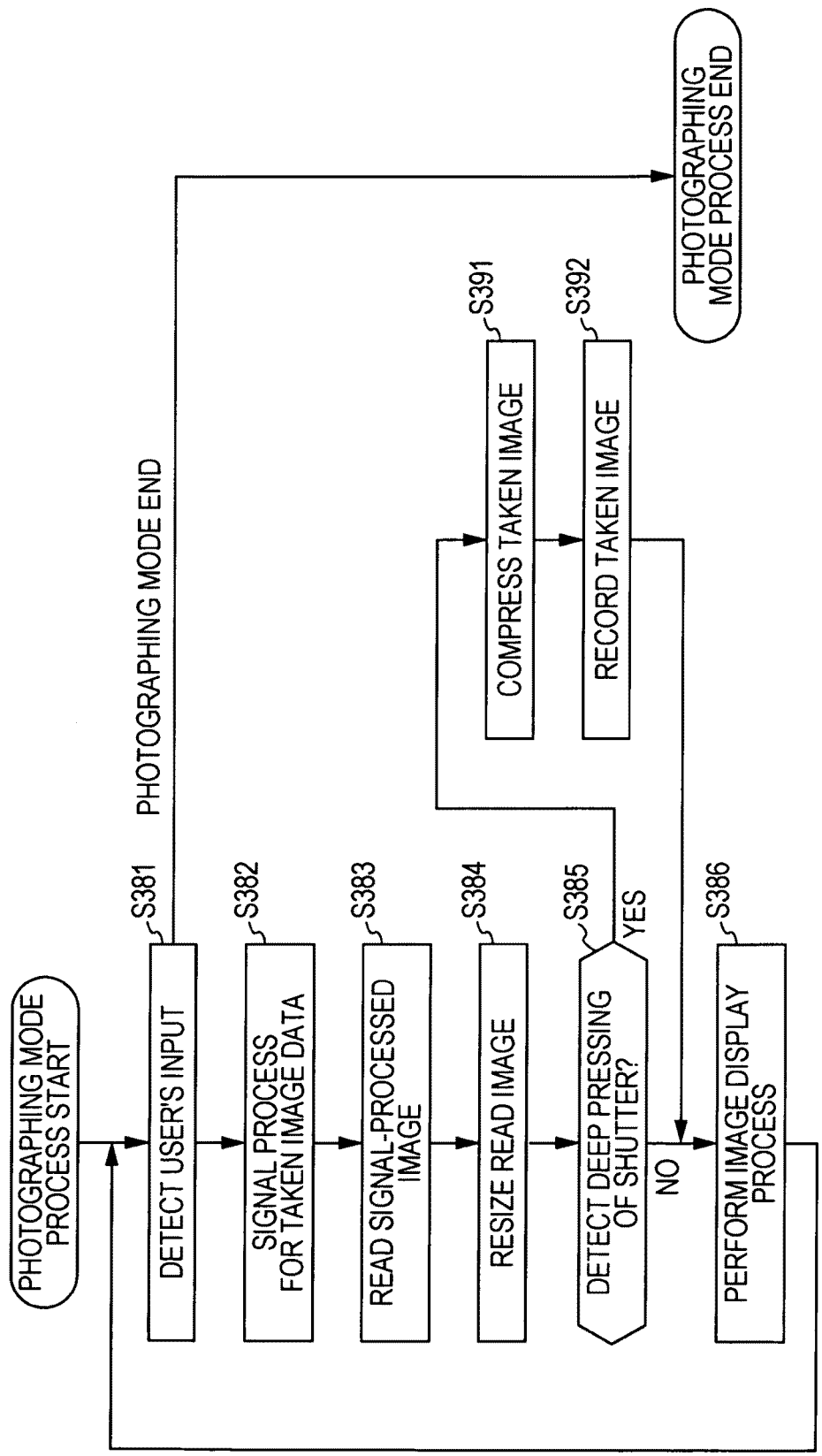
FIG. 15 is a flowchart illustrating a sequence of a photographing mode process performed in a capturing device according to an embodiment of the invention.

Next, a detailed sequence of the photographing mode process at step S380 in the whole sequence shown in FIG. 13 will be described with reference to a flowchart shown in FIG. 15.

At step S381, an input by the user is detected. The input by the user includes, for example, information for half-pressing of the shutter, a request for the termination of the photographing mode, or the like.

For example, if the information for half-pressing of the shutter is input, in step S382, a signal process for image data input via the lens section 111 is performed. This is performed in the signal processing section 113.

Next, at step S383, an image which has undergone the signal process is output and developed in the RAM 119 which is an image buffer.

At step S384, the read image is resized. This is a size adjustment process of a displayed image, corresponding to a size of a taken image or the number of images displayed on the display section (monitor) 121.

Next, at step S385, it is determined whether or not deep pressing of the shutter is detected.

When the deep pressing of the shutter is detected, the flow goes to step S391.

At step S391, the photographing process is performed, and a taken image is compressed.

At step S392, the taken image is recorded in the storage section 115 or the external memory 116.

When the deep pressing of the shutter is not detected at step S385 or after the recording of the taken image has been completed at step S392, images (preview images) are continuously displayed on the display section (monitor) at step S386.

In addition, when the deep pressing of the shutter is detected at step S385, the taken image is recorded at steps S391 and S392, and the display section (monitor) 121 automatically returns to the stereoscopic display to perform an auto review process where the recorded image is displayed for a specific time (auto review). After the auto review process is performed for a specific time, image signals which are sequentially read from the lens section 111 are sequentially updated, and the capturing device returns to a normal preview display where the stereoscopic display is performed.

A sequence of an image display control process for the display section (monitor) 121 which is performed at the time of the photographing process will be described with reference to a flowchart shown in FIG. 16. If the user performs the half-pressing of the shutter, the automatic focus adjustment (AF) function works to start a focusing process. The flowchart shown in FIG. 16 shows a display control process sequence which is performed after the focusing process has started.

At step S501, it is determined whether or not focusing is being performed, that is, whether the focus on an object to be photographed is correct. For example, whether or not focusing is being performed is determined by a contrast detection method which is performed as a typical focusing process.

When focusing is not being performed, the determination at step S501 is negative, and the flow goes to step S502. At step S502, images (preview images) input via the lens are displayed as stereoscopic images (3D images) on the display section (monitor).

Figure 16:
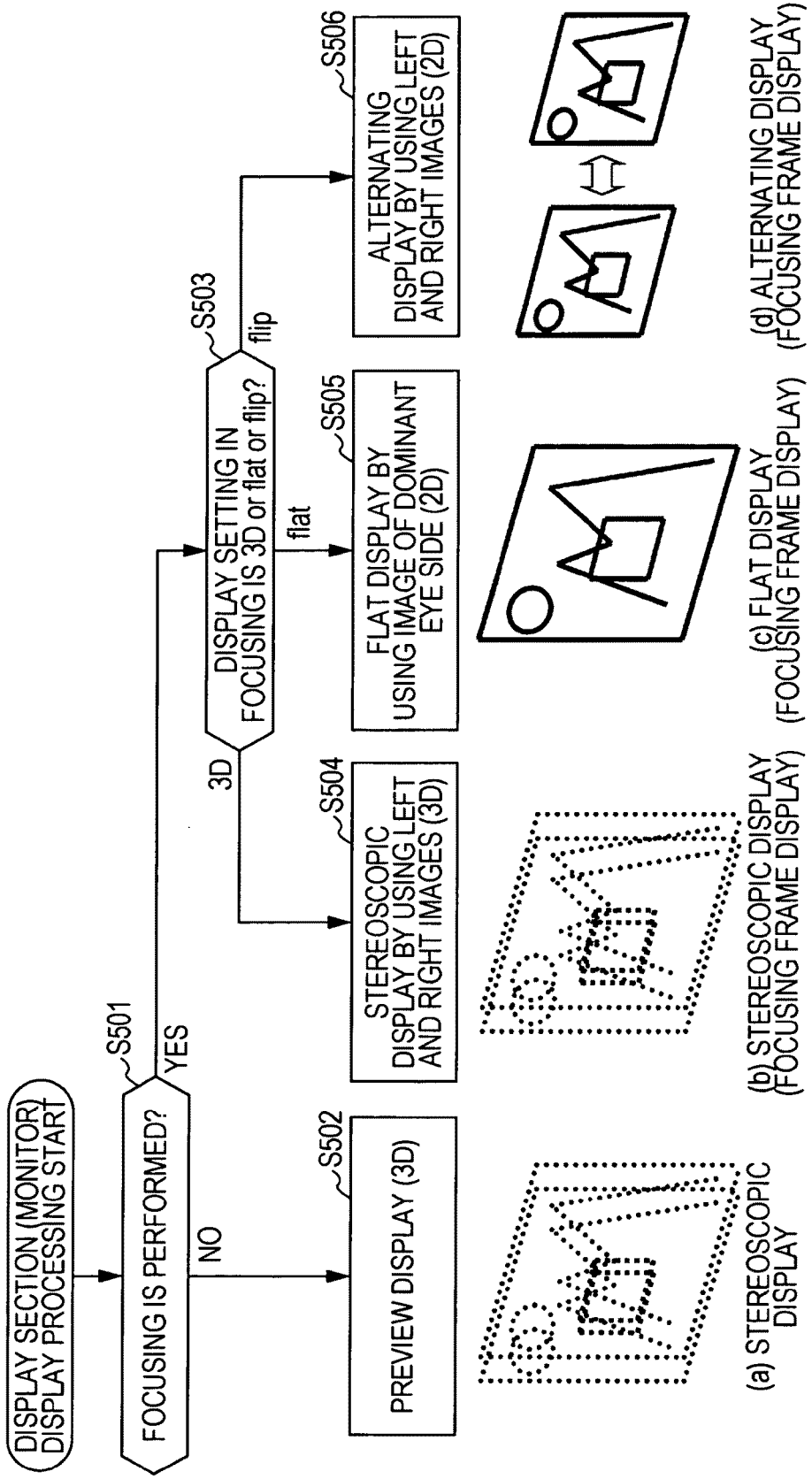
FIG. 16 is a flowchart illustrating a display process sequence during focusing performed in a capturing device according to an embodiment of the invention.

In the lower part of step S502 in FIG. 16, there is shown an example of (a) stereoscopic display images displayed on the display section (monitor) at step S502.

When the focusing is being performed, the determination at step S501 is affirmative, and the flow goes to step S503. At step S503, the setting information described above with reference to FIGS. 10 to 12 is obtained from the RAM 119. Here, the display setting information during focusing (f_focus) is obtained.

As described above, in the display setting information during focusing (f_focus), there are the three kinds of settings, that is, the stereoscopic display (3D), the dominant eye flat display (2D (flat)), and the alternating display (flip).

If the display setting information during focusing (f_focus)=stereoscopic display (3D), the flow goes to step S504.

If the display setting information during focusing (f_focus)=dominant eye flat display (2D (flat)), the flow goes to step S505.

If the display setting information during focusing (f_focus)=alternating display (flip), the flow goes to step S506.

When the display setting information during focusing (f_focus)=stereoscopic display (3D) is determined in the setting information determination process at step S503, the flow goes to step S504, and stereoscopic images are displayed on the display section (monitor) 121 by using left and right images. Also, in this case, as described above with reference to FIGS. 6 and 7, the L image and the R image which are applied to the stereoscopic image display are developed in the RAM 119, and the stereoscopic images are displayed by using the two different viewpoint images. In addition, at the time of this display, a focusing frame (focus frame) indicating that the focusing has been performed is displayed together.

In the lower part of step S504 in FIG. 16, there is shown an example of (b) stereoscopic display (focusing frame display) images displayed on the display section (monitor) at step S504.

When the display setting information during focusing (f_focus)=dominant eye flat display (2D (flat)) is determined at the setting information determination process at step S503, the flow goes to step S505, and the dominant eye flat display (2D (flat)) is performed on the display section (monitor) 121 by using an image of the dominant eye side. Also, in this case, as described above with reference to FIGS. 6 and 7, one sided image (image of the dominant eye side) of the L image and the R image which are applied to the flat image display is developed in the RAM 119, and the flat display is performed by using the image of the dominant eye side. In addition, at the time of this display, a focusing frame (focus frame) indicating that the focusing has been performed is displayed together.

In the lower part of step S505 in FIG. 16, there is shown an example of (c) flat display (focusing frame display) image displayed on the display section (monitor) at step S505.

When the display setting information during focusing (f_focus)=alternating display (flip) is determined at the setting information determination process at step S503, the flow goes to step S506, and the alternating display (flip) is performed on the display section (monitor) 121 by using left and right images. Also, in this case, one sided images (image of the dominant eye side) of the L image and the R image which are applied to the alternating display are sequentially developed in the RAM 119. The flat display is performed by sequentially applying the images. In addition, at the time of this display, a focusing frame (focus frame) indicating that the focusing has been performed is displayed together.

In the lower part of step S506 in FIG. 16, there is shown an example of (d) alternating display (focusing frame display) images displayed on the display section (monitor) at step S506.

The processes described with reference to FIG. 16 are exemplified by the auto focus control, but, as described above, the capturing device can perform the focus control manually. A user can operate the focus adjustment section 133 (refer to FIG. 4) to change the focus control to the manual adjustment such that a focus is adjusted.

A sequence of an image display control process for the display section (monitor) when performing the manual focus adjustment will be described with reference to a flowchart shown in FIG. 17.

At step S511, it is determined whether or not the manual focus adjustment has started. The determination is carried out based on whether or not the focus adjustment section 133 (refer to FIG. 4) is operated.

When the manual focus adjustment does not start, the determination at step S511 is negative, and the flow goes to step S512. At step S512, images (preview images) input via the lenses are displayed as stereoscopic images (3D images) on the display section (monitor).

Figure 17:
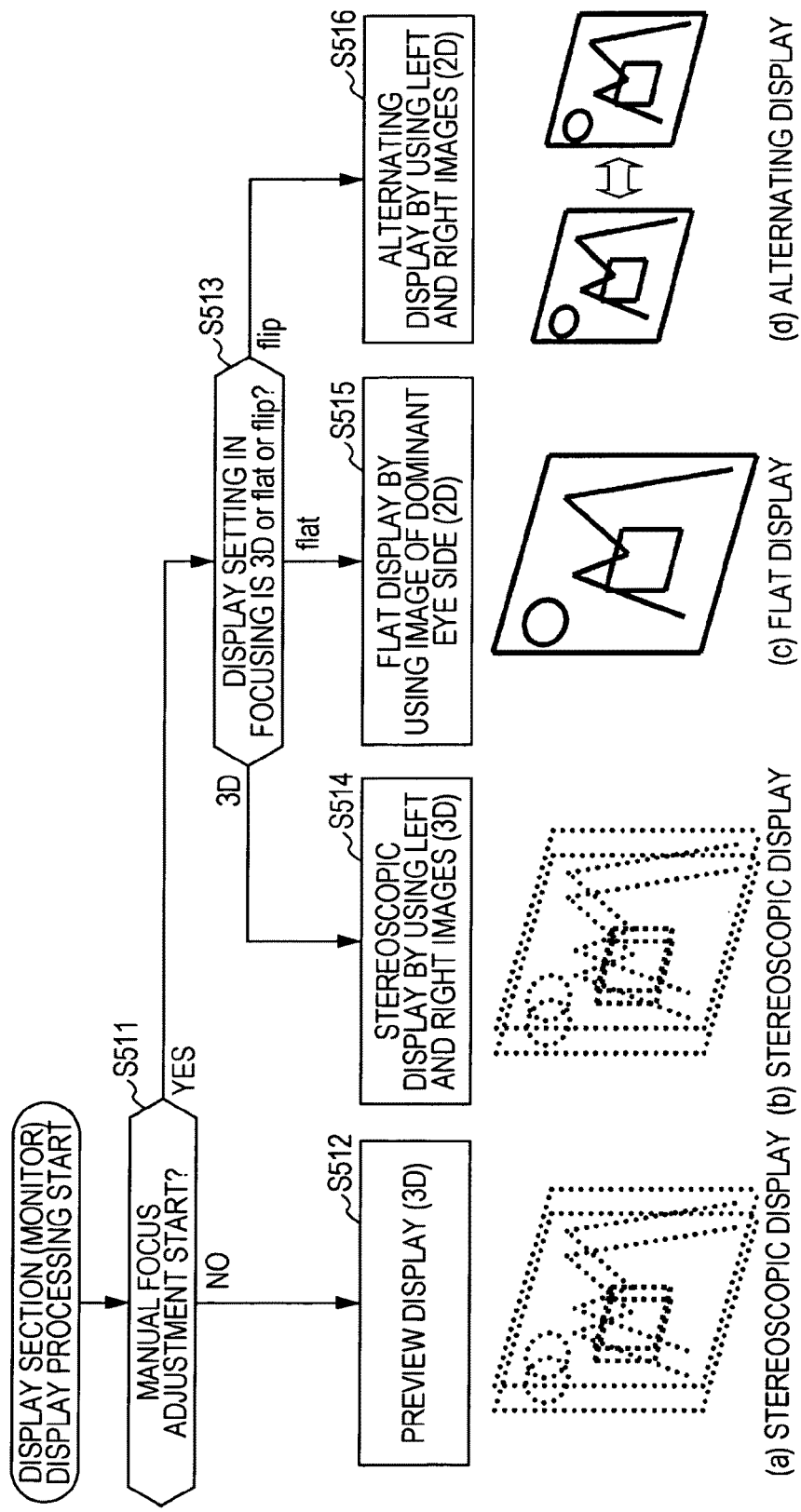
FIG. 17 is a flowchart illustrating a display process sequence at the time of a manual focus adjustment process performed in a capturing device according to an embodiment of the invention.

In the lower part of step S512 in FIG. 17, there is shown an example of (a) stereoscopic display images displayed on the display section (monitor) at step S512.

When the manual focus adjustment has started, the determination at step S511 is affirmative, and the flow goes to step S513. At step S513, the setting information described above with reference to FIGS. 10 to 12 is obtained from the RAM 119. Here, the display setting information during focusing (f_focus) is obtained.

As described above, in the display setting information during focusing (f_focus), there are the three kinds of settings, that is, the stereoscopic display (3D), the dominant eye flat display (2D (flat)), and the alternating display (flip).

If the display setting information during focusing (f_focus)=stereoscopic display (3D), the flow goes to step S514.

If the display setting information during focusing (f_focus)=dominant eye flat display (2D (flat)), the flow goes to step S515.

If the display setting information during focusing (f_focus)=alternating display (flip), the flow goes to step S516.

When the display setting information during focusing (f_focus)=stereoscopic display (3D) is determined in the setting information determination process at step S513, the flow goes to step S514, and stereoscopic images are displayed on the display section (monitor) 121 by using left and right images.

When the display setting information during focusing (f_focus)=dominant eye flat display (2D (flat)) is determined at the setting information determination process at step S513, the flow goes to step S515, and the dominant eye flat display (2D (flat)) is performed on the display section (monitor) 121 by using an image of the dominant eye side.

When the display setting information during focusing (f_focus)=alternating display (flip) is determined at the setting information determination process at step S513, the flow goes to step S516, and the alternating display (flip) is performed on the display section (monitor) 121 by using left and right images.

In this way, also in the case where the manual focus adjustment is performed, the display control is performed according to the preset display setting information during focusing (f_focus) in the same manner as the display control during focusing at the time of the auto focus adjustment.

In addition, also regarding the menu or the OSD information described above with reference to FIG. 8, the display control is performed according to the display setting information during focusing (f_focus) when focusing at the time of the auto focus adjustment or the manual focus adjustment.

Next, a display control sequence for the EVF will be described with reference to a flowchart shown in FIG. 18.

At step S521, it is determined whether or not there is a display request for the EVF (refer to FIG. 4) 122. The determination is carried out based on information which a user inputs to the EVF changing section 132 (refer to FIG. 4). Alternatively, the determination may be carried out based on the detection information of the sensor described above with reference to FIG. 5.

That is to say, when it is confirmed that the user views through the EVF based on the sensor detection information, it is determined that there is the EVF display request. When it is confirmed that the user does not view through the EVF, it is determined that there is no EVF display request.

When the determination at step S521 is negative, that is, there is no EVF display request, the flow goes to step S522, and the display process for the EVF 122 is not performed but the display process for the display section (monitor) 121 continues.

Figure 18:
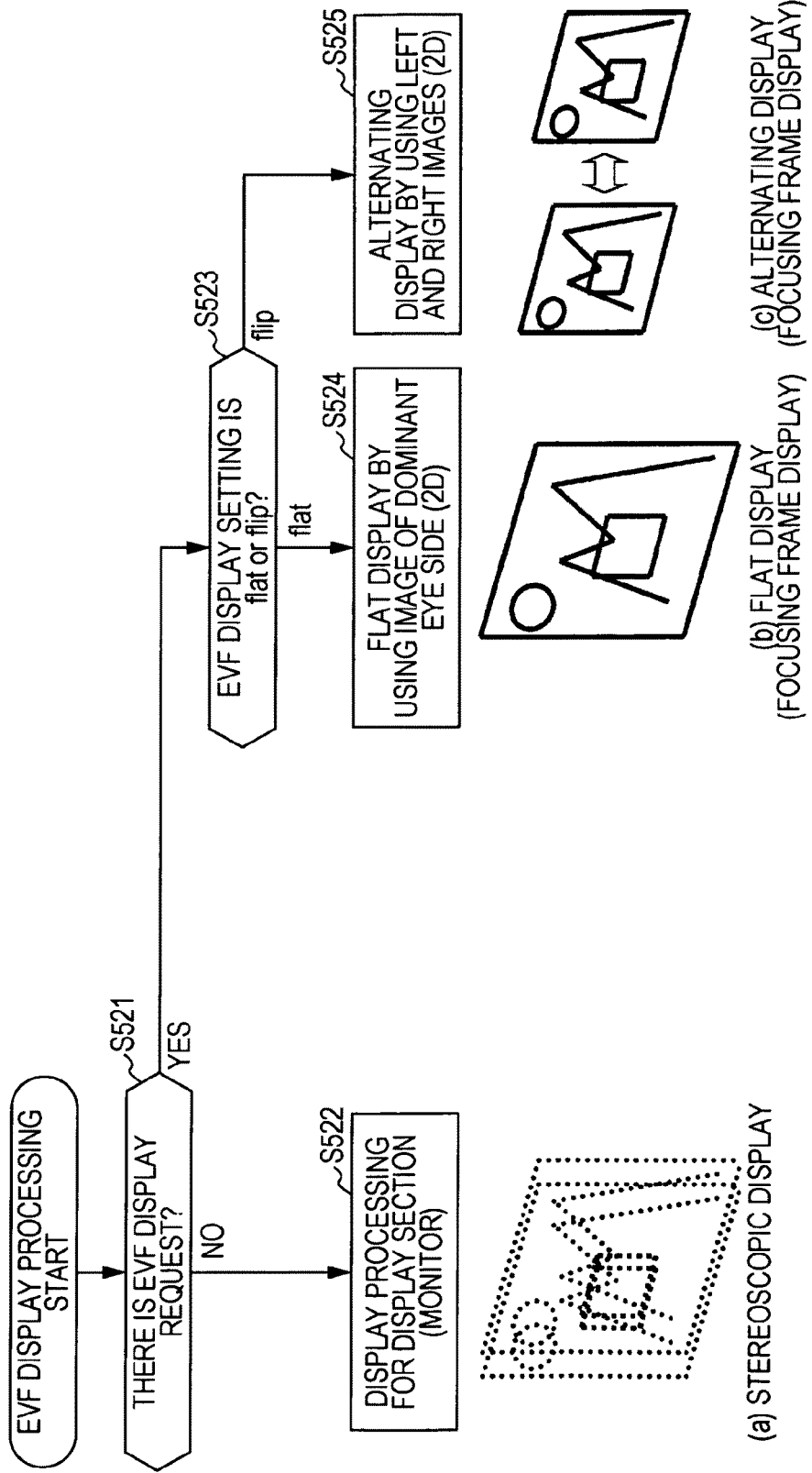
FIG. 18 is a flowchart illustrating a sequence of an EVF display process performed in a capturing device according to an embodiment of the invention.

In the lower part of step S522 in FIG. 18, there is shown an example of (a) stereoscopic display images displayed on the display section (monitor) at step S522.

On the other hand, when the determination at step S521 is affirmative, that is, it is determined that there is the EVF display request, the flow goes to step S523, and the EVF display setting information is obtained. The setting information described above with reference to FIGS. 10 to 12 is obtained from the RAM 119. Here, the EVF display setting information (f_evf) is obtained.

As described above, in the EVF display setting information (f_evf), there are two kinds of settings, that is, the dominant eye flat display (2D (flat)) and the alternating display (flip).

If the EVF display setting information (f_evf)=dominant eye flat display (2D (flat)), the flow goes to step S524.

If the EVF display setting information (f_evf)=alternating display (flip), the flow goes to step S525.

When the EVF display setting information (f_evf)=dominant eye flat display (2D (flat)) is determined at the setting information determination process at step S523, the flow goes to step S524, and the dominant eye flat display (2D (flat)) is performed on the EVF 122 by using an image of the dominant eye side. Also, in this case, as described above with reference to FIGS. 6 and 7, one sided image (image of the dominant eye side) of the L image and the R image which are applied to the flat image display is developed in the RAM 119, and the flat display is performed by using the image of the dominant eye side. In addition, at the time of this display, a focusing frame (focus frame) indicating that the focusing has been performed is displayed together.

In the lower part of step S524 in FIG. 18, there is shown an example of (b) flat display (focusing frame display) image displayed on the EVF at step S524.

When the EVF display setting information (f_evf)=alternating display (flip) is determined at the setting information determination process at step S523, the flow goes to step S525, and the alternating display (flip) is performed on the EVF 122 by using left and right images. Also, in this case, one sided images (image of the dominant eye side) of the L image and the R image which are applied to the alternating display are sequentially developed in the RAM 119. The flat display is performed by sequentially applying the images. In addition, at the time of this display, a focusing frame (focus frame) indicating that the focusing has been performed is displayed together.

In the lower part of step S525 in FIG. 18, there is shown an example of (c) alternating display (focusing frame display) images displayed on the EVF at step S525.

As described above, the invention has been described in detail with reference to specific embodiments. However, it is obvious that those skilled in the art can modify or change the embodiments without departing from the scope of the invention. In other words, the invention has been disclosed by exemplifying the embodiments, so the invention should not be construed as limiting the scope. If the scope of the invention is to be determined, the appended claims should be taken into consideration.

A series of processes described in the specification may be performed by hardware, software, or the combination thereof. When the processes are performed by software, they may be performed by installing programs recording a processing sequence in a memory of a computer, included in dedicated hardware, or by installing programs in a general computer which can execute various kinds of processes. For example, the programs may be recorded in a recording medium in advance. In addition to installing the programs in a computer from the recording medium, the programs may be received via a network such as LAN (Local Area Network) and Internet and installed in a recording medium such as an internal hard disc.

In addition, various kinds of processes may not only be performed along the disclosures in time-series, but may also be performed in parallel or independently, depending on a processing capability of a device performing the processes or if they are necessary. The system in this specification has a logical set configuration of plural devices, and the respective configuration devices are not limited to be placed in the same case.

It should be understood by those skilled in the art that various modifications, combinations, sub-combinations and alterations may occur depending on design requirements and other factors insofar as they are within the scope of the appended claims or the equivalents thereof.

What is claimed is:

1. A capturing device comprising:
   a display section that changes between and displays a three-dimensional (3D) image and a two-dimensional (2D) image;
   an input section to enable a user to select a set display mode during a menu setting operation which is to be utilized during a focus control process, said menu setting operation occurring prior to the focus control process, said input section including a first input to enable the user to select a 3D image display as the set display mode, a second input to enable the user to select a 2D image display as the set display mode, and a third input to enable the user to select an alternating display of a left eye image and a right eye image in which the left eye image and the right eye image are automatically alternated at a predetermined time interval as the set display mode and in which the left eye image and the right eye image are non-stereoscopic images; and
   a controller that performs an image display control for the display section,
   in which at a time of performing the focus control process the controller automatically causes the display mode of an image displayed on the display section to be the selected set display mode such that at the time of performing the focus control process the display mode is set to the selected set display mode without a mode changing display input from the user, and
   in which the predetermined time interval is several seconds, such that when the alternating display is selected as the selected set display mode a respective left eye image and a respective right eye image which are non-stereoscopic images are automatically alternated with a time interval of several seconds therebetween so that one of the respective left eye image or the respective right eye image is caused to be displayed on the display section for the several seconds and thereafter the other of the respective left eye image or the respective right eye image is caused to be displayed on the display section for the several seconds.

2. A capturing device comprising:
   a display section that changes between and displays a three-dimensional (3D) image and a two-dimensional (2D) image;
   an input section to enable a user to select an alternating display of a left eye image and a right eye image in which the left eye image and the right eye image are automatically alternated at a predetermined time interval and in which the left eye image and the right eye image are non-stereoscopic images, as a selected set display mode during a menu setting operation prior to a focus control process; and
   a controller that performs an image display control for the display section,
   in which at a time of performing the focus control process the controller automatically causes the display mode of an image displayed on the display section to be the selected set display mode such that at the time of performing the focus control process the display mode is set to the selected set display mode without a mode changing display input from the user, and
   in which the predetermined time interval is several seconds, such that when the alternating display is selected as the selected set display mode a respective left eye image and a respective right eye image which are non-stereoscopic images are automatically alternated with a time interval of several seconds therebetween so that one of the respective left eye image or the respective right eye image is caused to be displayed on the display section for the several seconds and thereafter the other of the respective left eye image or the respective right eye image is caused to be displayed on the display section for the several seconds.

3. An image processing method which performs a display control for a display section of a capturing device, wherein the display section of the capturing device changes between and displays a 3D image and a 2D image, the method comprising the steps of:
   enabling a user to select an alternating display of a left eye image and a right eye image in which the left eye image and the right eye image are automatically alternated at a predetermined time interval and in which the left eye image and the right eye image are non-stereoscopic images, as a selected set display mode during a menu setting operation prior to a focus control process; and
   performing an image display control for the display section by use of a controller,
   in which at a time of performing the focus control process the controller automatically causes the display mode of an image displayed on the display section to be the selected set display mode such that at the time of performing the focus control process the display mode is set to the selected set display mode without a mode changing display input from the user, and
   in which the predetermined time interval is several seconds, such that when the alternating display is selected as the selected set display mode a respective left eye image and a respective right eye image which are non-stereoscopic images are automatically alternated with a time interval of several seconds therebetween so that one of the respective left eye image or the respective right eye image is caused to be displayed on the display section for the several seconds and thereafter the other of the respective left eye image or the respective right eye image is caused to be displayed on the display section for the several seconds.

4. A non-transitory computer-readable recording medium having stored thereon a program which executes a display control for a display section of a capturing device, wherein the display section of the capturing device changes between and displays a 3D image and a 2D image, the program executing the steps of:

enabling a user to select an alternating display of a left eye image and a right eye image in which the left eye image and the right eye image are automatically alternated at a predetermined time interval and in which the left eye image and the right eye image are non-stereoscopic images, as a selected set display mode during a menu setting operation prior to a focus control process; and performing an image display control for the display section by use of a controller, in which at a time of performing the focus control process the controller automatically causes the display mode of an image displayed on the display section to be the selected set display mode such that at the time of performing the focus control process the display mode is set to the selected set display mode without a mode changing display input from the user, and in which the predetermined time interval is several seconds, such that when the alternating display is selected as the selected set display mode a respective left eye image and a respective right eye image which are non-stereoscopic images are automatically alternated with a time interval of several seconds therebetween so that one of the respective left eye image or the respective right eye image is caused to be displayed on the display section for the several seconds and thereafter the other of the respective left eye image or the respective right eye image is caused to be displayed on the display section for the several seconds.

\* \* \* \* \*